United States Patent [19]
Ishida et al.

[11] Patent Number: 5,318,034
[45] Date of Patent: Jun. 7, 1994

[54] ELECTRICALLY ADJUSTABLE DELAY CIRCUIT AND ULTRASONIC DIAGNOSIS APPARATUS

[75] Inventors: Kazunari Ishida, Kashiwa; Kazutaka Okada, Abiko; Toshio Kondo, Kunitachi; Toshio Ogawa, Chiba; Norio Yokozawa, Kashiwa; Takashi Ichikawa, Kawaguchi, all of Japan

[73] Assignee: Hitachi Medical Corp., Tokyo, Japan

[21] Appl. No.: 982,558

[22] Filed: Nov. 27, 1992

[30] Foreign Application Priority Data

| Nov. 27, 1991 | [JP] | Japan | 03-312254 |
| Dec. 5, 1991 | [JP] | Japan | 03-348408 |
| Feb. 24, 1992 | [JP] | Japan | 04-072100 |
| May 1, 1992 | [JP] | Japan | 04-112656 |

[51] Int. Cl.$^5$ .............................................. A61B 8/00
[52] U.S. Cl. ............................ 128/661.01; 333/150; 333/152
[58] Field of Search ............... 333/164, 156, 150, 152; 307/320; 73/625, 626, 628; 128/661.01, 661.08, 661.09; 315/368.17

[56] References Cited

U.S. PATENT DOCUMENTS

| 3,975,766 | 8/1976 | Sano et al. | 315/368.17 |
| 5,078,146 | 1/1992 | Sato | 128/661.08 |
| 5,092,337 | 3/1992 | Vohiumi et al. | 128/661.01 |
| 5,146,192 | 9/1992 | Kondo et al. | 333/164 |

FOREIGN PATENT DOCUMENTS

| 62-137043 | 6/1987 | Japan | 128/660.01 |
| 63-129863 | 8/1988 | Japan | 128/660.01 |

Primary Examiner—William E. Kamm
Assistant Examiner—George Manuel
Attorney, Agent, or Firm—Antonelli, Terry, Stout & Kraus

[57] ABSTRACT

This invention provides a delay circuit capable of electrically varying the delay amount comprising a first transistor for receiving a signal to be delayed from the base connected to an input terminal and outputting a positive phase signal and a negative phase signal with respect to the signal from the input terminal, respectively from the emitter and the collector thereof; two variable capacity diodes with their terminals of the same polarity connected together and a specified control voltage applied to the point of said connection, one end of the connected diodes being connected to the emitter of said first transistor; a second transistor with the base grounded, the emitter connected to the collector of the above-mentioned first transistor, and the collector connected to one end of a specified resistance; and a delayed signal output terminal having connected thereto the other end of the two variable capacity diodes and the other end of the specified resistance. According to this invention, an ultrasonic diagnosis apparatus using this delay circuit is also provided.

13 Claims, 16 Drawing Sheets

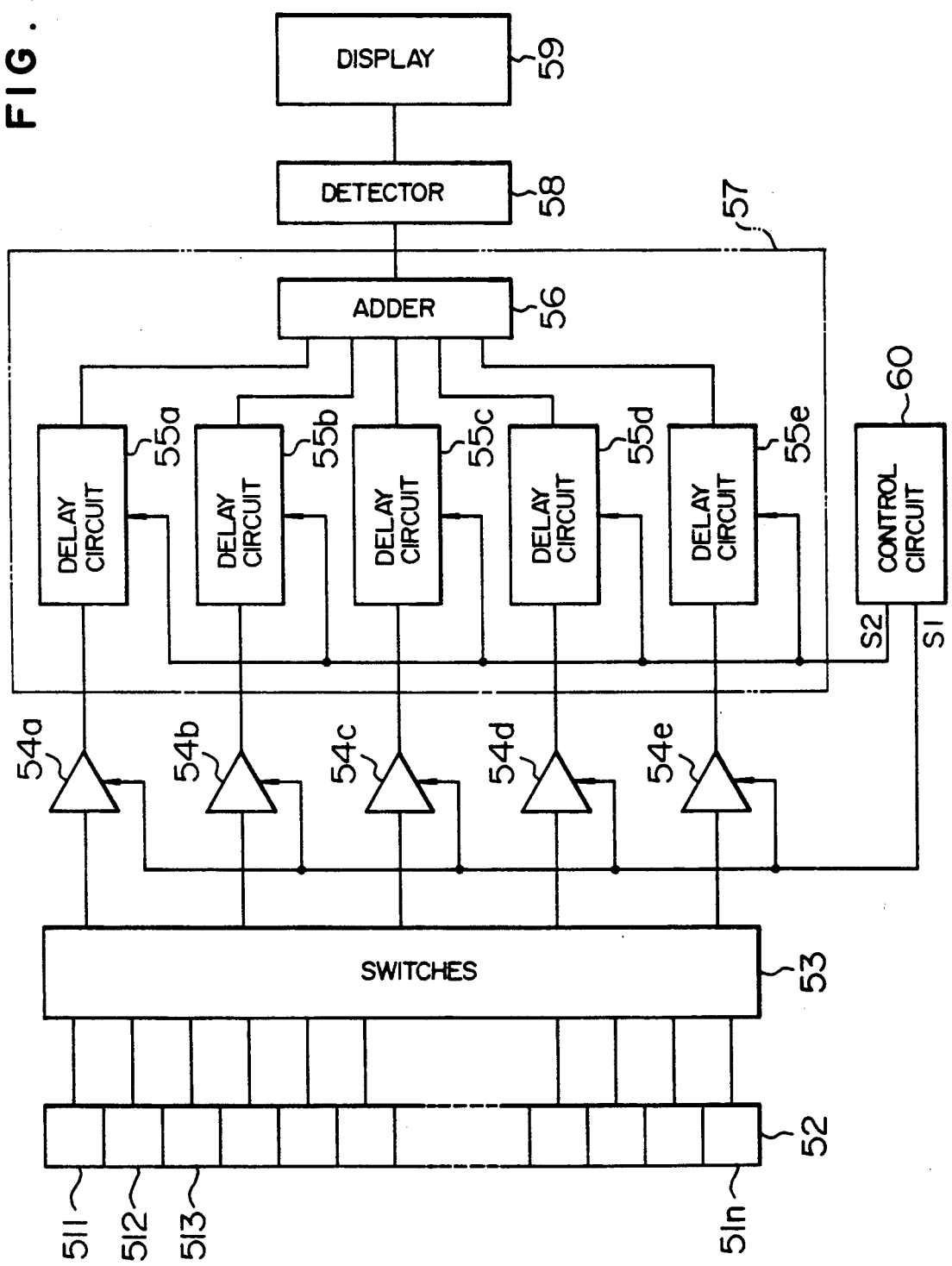

ELECTRICALLY ADJUSTABLE DELAY CIRCUIT AND ULTRASONIC DIAGNOSIS APPARATUS

BACKGROUND OF THE INVENTION

This invention relates to a delay circuit for continuously varying a delay time by an electric signal applied to a control terminal and also to an ultrasonic diagnosis apparatus capable of dynamic focusing by using this delay circuit in the phasing circuit.

The ultrasonic diagnosis apparatus sends and receives ultrasonic waves to and from a human body under medical examination through a probe, and obtains information about the inside of the examined body from the reflected wave signal from the inside of the examined body. To obtain images with high resolution of any places at different depths of the inside of the examined body, when receiving the reflected waves from inside the body, dynamic focusing is performed which dynamically varies the focus of the received waves with passage of time. In dynamic focusing, the reflected waves are received by the individual oscillator elements of a probe comprising a plurality of narrow, strip-shaped oscillator elements or a probe comprising concentric, ring-shaped oscillator elements, and the received wave signals are brought to focus by delaying those signals in suitable degrees by using delay lines and adding those signals. This circuit is generally called a phasing circuit. The focal positions of the received waves are determined by delay times of the delay lines. Therefore, dynamic focusing is achieved by dynamically varying the delay times to be given to a plurality of received wave signals according to the depths in the examined body at which the ultrasonic waves are reflected back.

Conventionally, the above-mentioned delay times are varied by providing the delay lines with taps at suitable intervals and selectively switching over from one tap to another with an electronic switch. In this case, when the above-mentioned electronic switch is operated, noise sometimes occurs and enters the received wave signals through the delay lines, so that wrong signals occasionally appear in diagnostic information. To remove this phenomenon, it is only necessary to use a type of switch less liable to produce noise as the electronic switch mentioned above. However, this method has a problem of wastefulness that such an electronic switch is expensive and if many such switches are mounted to correspond to the number of taps of the delay lines, production cost rises.

So, a delay circuit has emerged which uses variable delay elements, each comprising a variable capacity diode and a resistor.

Before proceeding to description of this variable delay element, the principle of the RC delay element will be described with reference to FIG. 1.

In FIG. 1, reference numeral 21 denotes an ideal operational amplifier with a gain of 1, and 22 denotes an ideal operational amplifier with a gain of −1. As illustrated, the ideal operational amplifier 21 is connected in series with a resistor, and the ideal operational amplifier 22 is connected in series with a capacitor, and these two series circuits are connected in parallel.

The transfer function of this circuit network is expressed by the following expression (1).

$$E_{out}/E_{in} = sCR/(1+sCR) \qquad (1)$$

where $s = j\omega$ and $j^2 = -1$

From the expression (1), the equation to find the delay time T is given as follows.

$$T = 2RC/(1+\omega^2 R^2 C^2) \qquad (2)$$

To be more specific, the delay time when the angular frequency $\omega$ is sufficiently smaller than $1/CR$, the delay time is $2RC$, and by varying the resistance value or the capacity value, the delay time can be varied. In practice, by using a variable capacity diode the capacitance of which is varied by an electric signal, the delay time can be varied.

As means for effecting variable delay mentioned above, a so-called variable delay circuit which can control the delay time by an electric signal instead of the above-mentioned delay line with taps has been proposed in Japanese Utility Model Application Laid Open No. 63-129863. As shown in FIG. 3, this variable delay circuit 1 receives an input signal Ein supplied from the base of the transistor Tr, and outputs, respectively from the emitter and collector of the transistor Tr, a positive phase signal and a negative phase signal with respect to the input signal Ein, which signals have substantially equal amplitudes and a phase difference of 180° between them. The positive phase signal is input to one end of a series circuit of two variable capacity diodes $VC_1$ and $VC_2$ in series with their cathodes tied together, the capacitance of the two variable capacity diodes $VC_1$ and $VC_2$ is varied by the magnitude of the reverse voltage Ec, while the negative phase signal from the above-mentioned collector is input to one end of a resistor R. The other end of the series circuit of the above-mentioned variable diodes $VC_1$ and $VC_2$ and the other end of the above-mentioned resistor R are connected together to provide an output signal Eout. In this circuit configuration, the delay time used to be varied by a change in the reverse voltage Ec applied to the above-mentioned variable capacity diodes.

In FIG. 3, a symbol Rin denotes a resistor to give an electric potential to the base of the transistor Tr, and a symbol Rb denotes a resistor to prevent oscillation. Meanwhile, the load resistors RV− and RV+ in the emitter and collector circuits of the transistor Tr have substantially equal resistance values to ensure that the amplitude of the signal voltage at the emitter is equal to the amplitude of the signal voltage at the collector. Therefore, the above-mentioned transistor Tr works as a phase splitter. With regard to the output signals which differ 180° in phase in the transistor Tr, one signal is sent through the variable capacity diodes $VC_1$ and $VC_2$ to which the reverse voltage Ec is applied through a resistor r, and the other signal is sent through the resistor R, and the two signals are added together and output as an output signal Eout.

Either one of the above-mentioned variable capacity diodes $VC_1$ and $VC_2$ may be a fixed capacitor. In the variable delay circuit shown in the above-mentioned published utility model application, the circuits shown in FIG. 3 connected in a multi-stage cascade connection are used.

In the variable delay circuit 1 shown in FIG. 3, if the input voltage at the input terminal is denoted by Ein, the output voltage at the output terminal by Eout, the capacitance of the variable capacity diodes $VC_1$ and $VC_2$ by C and the constant by s, the transfer function of this circuit network is expressed as follows.

$$\frac{Eout}{Ein} = \frac{s - 1/RC}{s + 1/RC} \quad (3)$$

where $s = j\omega$ (j : complex number, $\omega$: angular frequency of signal)

The above expression (3) corresponds to a first-order allpass transfer function. In this case, if the phase transition amount is denoted by $\beta(\omega)$, the phase transition amount can be given by $$\beta(\omega) = -2 \tan^{-1} \omega RC \quad (4)$$

If the delay time Tgd is obtained from the expression (3), Tgd is given as follows.

$$Tgd = \frac{2RC}{(\omega RC)^2 + 1} \quad (5)$$

In this expressed (5), when $(\omega RC)^2 << 1$, the delay time Tgd is the value of 2RC regardless of the magnitude of $\omega$, that is, a value proportional to the resistance value of the resistor R or the capacitance C of the variable capacity diodes $VC_1$ and $VC_2$. Therefore, assuming that the resistance R is constant, by varying the capacitance C of the variable capacity diodes $VC_1$ and $VC_2$, the delay time Tgd can be controlled continuously.

As another example of prior art, there has been proposed in JP-A-62-137043 that a delay circuit which is controlled by an electric signal. The delay circuit in this patent application publication, as shown in FIG. 2, is a circuit made up of a combination of two transistors $TR_1$ and $TR_2$, a resistor R, and a variable capacity diode VC, and this delay circuit controls the delay time by varying the capacitance of the above-mentioned variable capacity diode VC by an electric signal from a control terminal 2 to thereby effect dynamic focusing.

In yet another example, as shown in FIG. 6, by transposing the positions where the resistor R and the variable capacity diode VC are connected in FIG. 2, and adjusting the resistor R73, the attenuation of signal can be corrected.

A similar circuit is carried in Arthur B. Williams "ELECTRONIC FILTER DESIGN HANDBOOK" McGraw-Hill 1981.

In FIG. 6, IN denotes a signal input terminal, OUT denotes a signal output terminal, CNT denotes a capacity control signal (delay time control signal) input terminal, $V_{CC}$ denotes a power source, C71 and C72 denotes capacitors, R71 to R77 denote resistors, and TR2 and TR3 denote transistors.

In the delay circuit 1 mentioned earlier, however, since there is a theoretical limit to the frequency characteristics of the delay time, a large delay amount cannot be set for each section thereof. So, it is possible to form a circuit having the above-mentioned delay circuits 1 connected in multiple stages to obtain a necessary delay amount, but this gives rise to a problem that current consumption increases which is uneconomical. In addition, another problem arises that the high frequency characteristics deteriorate due to the Miller effect in the first transistor $TR_1$ for providing positive and negative phase signals with respect to an input signal to be delayed.

FIG. 4 shows an example of calculations of the frequency-gain characteristics of the output signal when a fixed capacity C is used in place of the variable capacity diodes $VC_1$ and $VC_2$ in FIG. 4, and the circuit constants are given as shown below, and FIG. 5 shows an example of calculations of the frequency-delay time characteristics.

| Circuit constants | |
|---|---|
| Power source +Vcc | +12 V |
| Power source −Vcc | −6 V |
| Resistor Rin | 10 kΩ |
| Resistor Rb | 108 Ω |
| Resistor RV+ | 1 kΩ |
| Resistor RV− | 1 kΩ |
| Resistor R | 250 Ω |
| Capacitor C | 20 pF |

Incidentally, in FIG. 3, since the resistor r has a sufficiently large value, the terminal of the resistor r was regarded as open in the calculations. As is obvious from FIG. 5, when the frequency exceeds a certain value, the delay time decreases as the frequency increases. For example, it will be understood that the frequency at which the delay time substantially constant over a range of frequencies decreases about 10% is about 7.8 MHz.

In the variable delay circuit 1 shown in FIG. 3, however, the delay time suddenly decreases when the frequency becomes higher than a certain value as shown in FIG. 5. In the frequency-delay time characteristics shown in FIG. 5, to raise the upper limit of the frequencies that can maintain the delay time at a substantially constant length, it is only necessary to use a small capacitance C in the expression (5) mentioned above to set a reduced delay time for every one stage, and connect variable delay circuits 1, shown in FIG. 3, in a multistage cascade connection to obtain a required length of delay time. However, in such a circuit configuration, the number of parts used increases and the circuit becomes large, resulting in a large current consumption and a high cost. As a solution to this problem, to decrease the size of the above-mentioned variable delay circuit and reduce cost, it is desirable that the delay time for every one stage of circuit does not decrease up to a high frequency range.

An ultrasonic diagnosis apparatus using a conventional delay circuit, such as this, has a received wave phasing circuit included, and this received wave phasing circuit comprises a circuit which performs what they call focusing of received waves by giving a predetermined delay to the individual outputs from the respective oscillator elements in the ultrasonic probe and adding up the output signals.

FIG. 7 shows an example of a concrete circuit configuration. In FIG. 7, the received wave phasing circuit comprises delay circuit sections 43 each including a first fixed delay circuit 413, a second fixed delay circuit 414, and an aperture control circuit 416, and a third fixed delay circuit 42. Each delay circuit section 43 accepts received wave signals from four channels out of all channels of the oscillator elements of an ultrasonic probe, not shown, and the received wave signals of the four channels are each given predetermined delays by the first fixed delay circuit 413 and the second fixed delay circuit 414, and the delayed outputs are added together by the second fixed delay circuit 414.

The aperture control circuit 416 comprises circuits for controlling the variable aperture for improving the ultrasonic beam characteristics by varying the aperture according to the reception time, and more specifically, the aperture control circuit 416 is formed by a switch circuit which allows a signal to pass or cut it off.

Signals from the delay circuit 43 are sent to the third fixed delay circuit 42.

The received wave phasing circuit 4 has a plurality of delay circuit sections 43. For example, if the received wave phasing circuit is a 64-channel unit, the phasing circuit includes 16 delay circuit sections 43, and if the received wave phasing circuit is a 128-channel unit, the phasing circuit includes 32 delay circuit sections 43.

Signals from the delay circuit section 43 are sent to the third fixed delay circuit 42, and are each given predetermined delay amounts, and are added together. The delay circuit section 43 chiefly controls focusing while the third fixed delay circuit 42 chiefly controls the scanning direction of the ultrasonic beam (deflection of the ultrasonic beam).

In the received wave shaping circuit thus constructed, when dynamic focusing of the received waves is performed, it is only necessary to vary the delay times for outputs from the individual oscillator elements while receiving the waves.

SUMMARY OF THE INVENTION

An object of the present invention is to provide a delay circuit which allows arbitrary selection of the delay time in initial state, which makes it possible to simplify the configuration of the control circuit (the control circuit of the received wave phasing circuit when a delay circuit according to the present invention is used in the received wave shaping circuit of the ultrasonic diagnosis apparatus) for giving a delay time control signal, which saves current consumption, and which inhibits the deterioration of the frequency characteristics, and also provide an ultrasonic diagnosis apparatus capable of dynamic focusing by using this delay circuit in the phasing circuit.

To achieve the above object, in the variable delay circuit according to the present invention which receives an input signal from the base of a transistor, and outputs, respectively from the emitter and the collector of the transistor, positive and negative phase signals with respect to the input signal, which signals have substantially equal amplitudes and a phase difference of 180° between them, has the positive phase signal from the emitter input to one end of variable capacity diodes, the capacitance of which diodes is varied by the magnitude of a reverse voltage applied to the diodes, has the negative phase signal from the collector input to one end of a resistor, supplies an output signal by connecting together the other end of the variable capacity diodes connected in series and the other end of the resistor, and varies the delay time by a change of the reverse voltage applied to the variable capacity diodes, the improved feature of this variable delay circuit is that an inductor having had the Q value adjusted is connected in series with the other end of the resistor to which the negative phase signal from the collector of the transistor is input.

In an ultrasonic diagnosis apparatus as a related invention of the above-mentioned variable delay circuit comprising a probe having a plurality of oscillator elements arranged for sending and receiving ultrasonic waves; a phasing circuit, having delay circuits for giving predetermined delay times to the received wave signals from the individual oscillator elements, for adding and outputting the received wave signals matched in phase by those delay circuits; a detector for detecting the signals phase-matched by the phasing circuit; and a display device for displaying output signals from the detector as an image, the improved feature of this ultrasonic diagnosis apparatus is that the above-mentioned variable delay circuit is used as the delay circuit in the above-mentioned phasing circuit.

The thus configured variable delay circuit has a Q-value-adjusted inductor connected in series with the other end of the resistor to which the negative phase signal from the collector of the transistor is input. Therefore, this variable delay circuit achieves the same effect as increasing the resistance R in a high frequency range in the above-mentioned expression (5) to give the delay time Tgd, and prevents the delay time Tgd from decreasing and reduces the phase changes, so that the frequency characteristics of the variable delay circuit can be improved.

The ultrasonic diagnosis apparatus constructed as described uses variable delay circuits which prevent the delay times from decreasing in the high frequency range, reduces the phase changes, and owing to the use of the variable delay circuits having thus improved frequency characteristics, can achieve dynamic focusing with better high frequency characteristics.

Further, in the above-mentioned variable delay circuit, a delayed signal at each unit variable delay circuit is selected arbitrarily by a selector, and obtained as an output signal of the circuit, so that the delay time in the initial state and the extent of change of the delay time can be selected arbitrarily.

When the received wave phasing circuit for controlling the phases of the received wave signals is formed by a plurality of variable delay circuits mentioned above, a common control signal (delay time control signal) is applied to every specified number of grouped channels of the oscillator element array of the probe. In this manner, the control circuit (delay time control circuit) of the received wave circuit can be simplified.

In an embodiment, for dynamic focusing, the delay time control signal (voltage applied to the variable capacity diodes) is varied, and a selector is not used for delay time selection. It has been clarified by soft simulation that errors between the desired delay time and the actual delay time when a delay time control signal in dynamic focusing is applied to every grouped set of channels as mentioned above is substantially negligible.

By manipulation of the selector, it is possible to correct a delay time error of each variable delay circuit in initial state when the direction of the ultrasonic wave beam is decided prior to dynamic focusing, that is, it is possible to correct a difference between the desired delay time in initial state and the actual delay time in initial state when a control signal is applied as a common signal to many channels of the oscillators.

Therefore, the number of lines of control signal (delay time-control signal) can be reduced, and the control circuit for giving a control signal can be simplified.

The ultrasonic diagnosis apparatus according to the present invention basically comprises a group of variable delay circuits for respectively receiving outputs of the arranged oscillator elements of the ultrasonic probe; a set of multiple fixed delay circuits for respectively receiving outputs of the individual variable delay circuits; and a adder circuit for adding outputs of the individual delay circuits, wherein the above-mentioned variable delay circuits are arranged so that the focus can be varied during the reception period, and wherein each of the above-mentioned fixed delay circuits includes a received wave phasing circuit arranged so that the scanning direction can be varied during other than the wave reception period.

With the ultrasonic diagnosis apparatus constructed as described, in the received wave phasing circuit, outputs from the oscillators arranged in the ultrasonic probe, at the stage prior to being input to the adder circuit, are input to the variable delay circuits capable of varying the focus during the reception period, and outputs of the variable delay circuits are input to the fixed delay circuits capable of varying the scanning direction other than during the reception period.

In this arrangement, the scanning direction is changed by stepped switching by the fixed delay circuits as in the prior art, but since this switching is done other than during the reception period, noise produced by the stepped switching poses any problem.

A feature of the present invention is that the focus is changed during the reception period, but the focus is changed by smooth change by the variable delay circuits, in other words, change without switching. Therefore, a stepped-pattern image does not appear and noise caused by switching can be prevented.

The above-mentioned conventional variable delay circuit in itself is known to be poor in the frequency characteristics and the delay accuracy. However, without additionally providing the prior-art type variable delay circuit such as this with a function to vary the scanning line, that is to say, by providing only the function to vary the focus, the variable delay circuit can be used by keeping the above-mentioned frequency characteristics and delay accuracy respectively within the allowable ranges.

BRIEF DESCRIPTION OF THE DRAWINGS

FIG. 13 is a diagram showing a structural example of the ultrasonic diagnosis apparatus according to an embodiment of the present invention;

DESCRIPTION OF THE PREFERRED EMBODIMENTS

Embodiments of the present invention will be described in detail with reference to the accompanying drawings.

Figure 8:
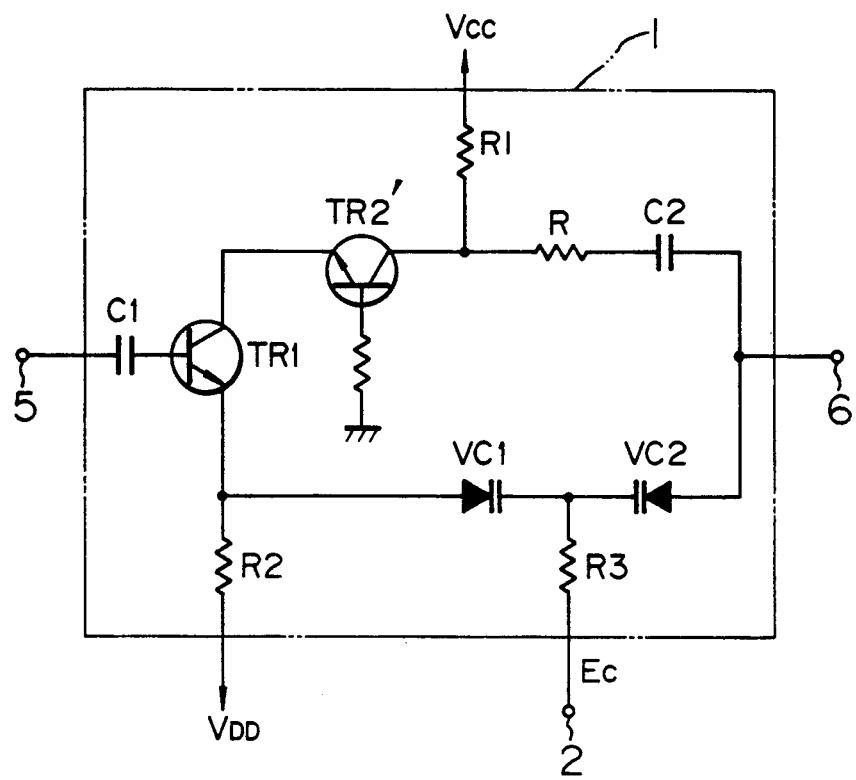
FIG. 8 is a structural diagram showing an embodiment of the delay circuit of delay time variable by an electric signal according to the present invention.

FIG. 8 is a circuit diagram showing an embodiment of the delay circuit 1 according to the present invention. This delay circuit 1 continuously varies the delay time by an electric signal applied to a control terminal 2. As shown in FIG. 8, the delay circuit includes a first transistor which receives an input signal from the base and outputs a positive phase signal and a negative phase signal with respect to the input signal, respectively from the emitter and the collector, a pair of variable capacity diodes $VC_1$ and $VC_2$, which receive at one end the positive phase signal from the emitter of the first transistor $TR_1$ and the capacitance of which is varied by the magnitude of a reverse voltage Ec, a resistor R which at one end receives the negative phase signal from the collector of the above-mentioned first transistor $TR_1$, and a common-base second transistor $TR_2'$ connected at a point where $TR_2'$ receives the negative phase signal from the first transistor $TR_1$. The delay circuit 1 connects between the other end of the above-mentioned pair of variable capacity diodes $VC_1$ and $VC_2$ and the other end of the resistor R, output signal and supplies an, and varies the delay time according to a change in the reverse voltage Ec applied to the above-mentioned variable capacity diodes $VC_1$ and $VC_2$. In FIG. 8, symbols $R_1$, $R_2$, and $R_3$ denote resistors, and $C_1$ and $C_2$ denote capacitors.

Figure 6:
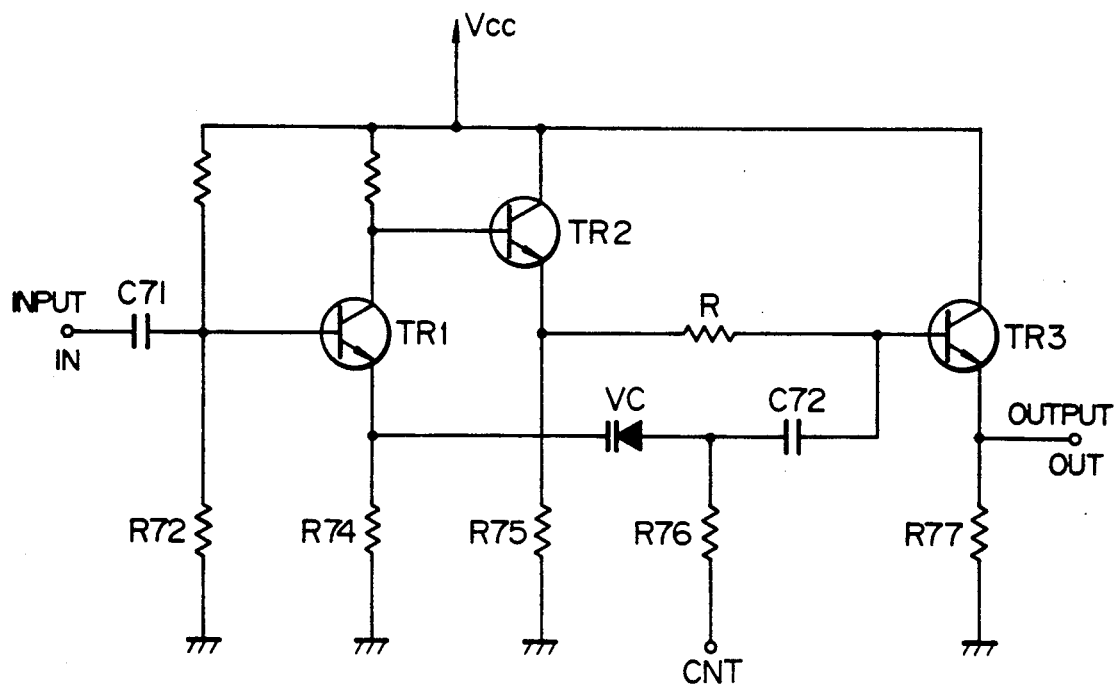
FIG. 6 is a structural diagram of yet another prior-art delay circuit.
Figure 7:
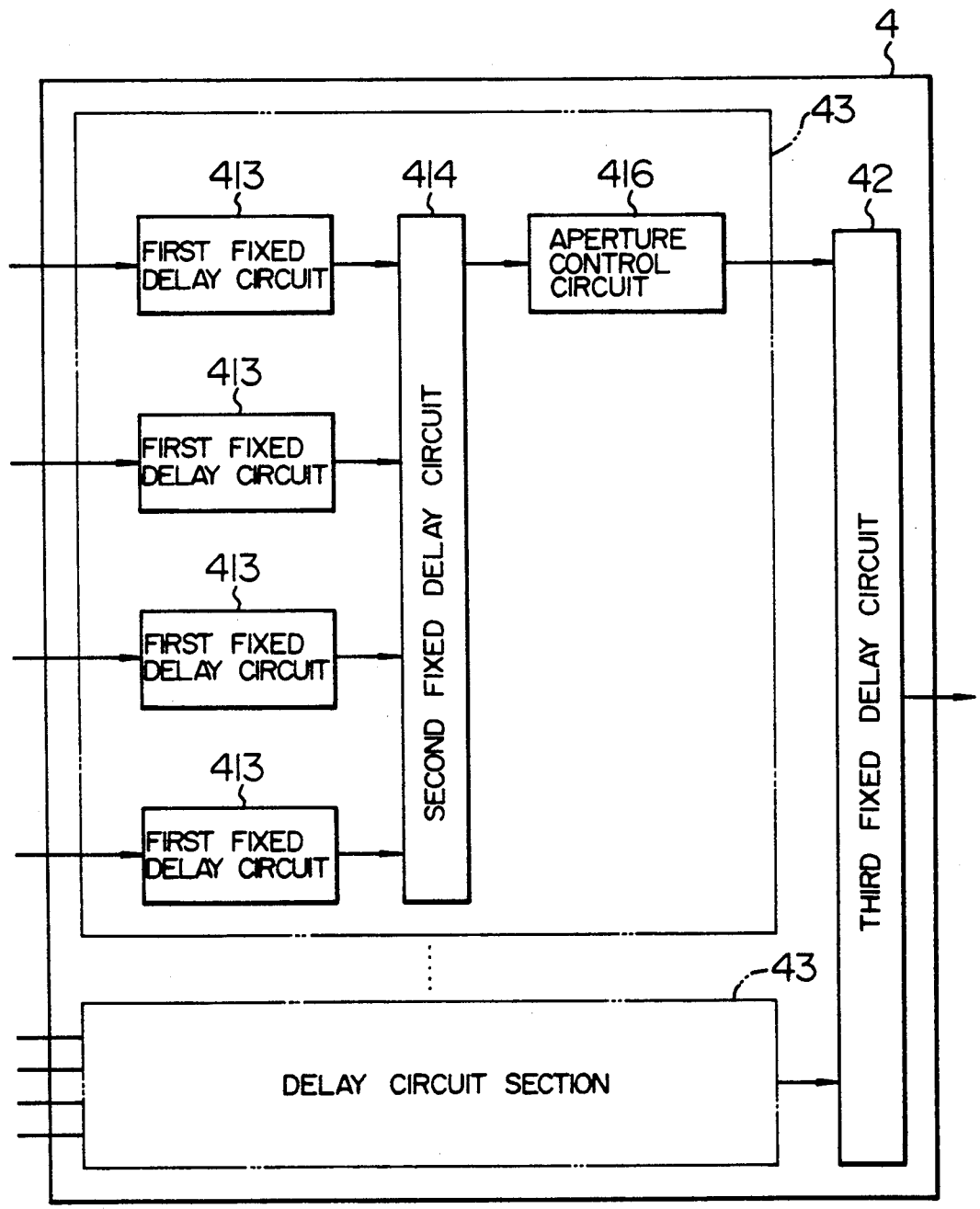
FIG. 7 is a structural diagram of a prior-art received wave phasing circuit.

In this embodiment, a common-base transistor $TR_2'$ shown in FIG. 8 is used in place of the second transistor $TR_2$ which is an emitter follower shown in FIG. 6, and two variable capacity diodes $VC_1$ and $VC_2$, the cathodes of which are connected together in a butt joint, are used in place of the variable capacity diode VC shown in FIG. 6, with the result that a delay circuit 1 according to the present invention shown in FIG. 8 is obtained. Under this circuit arrangement, when the operating point of $VC_1$ of the variable capacity diodes is moved by a high frequency signal voltage applied it and its capacitance increases, the other variable capacity diode $VC_2$ operates to decrease its capacitance. For this reason, the amount of the capacitance which varies by being modulated by the high frequency signal voltage is decreased in comparison with a case where only one variable capacity diode VC is used like in FIG. 6.

The reverse voltage Ec is applied from the control terminal 2 through a resistor $R_3$ to the point where the cathodes of the above-mentioned two variable capacity diodes $VC_1$ and $VC_2$ are connected together, so that the delay time is controlled by varying the capacitance of the pair of the variable capacity diodes $VC_1$ and $VC_2$ by the reverse voltage Ec. Meanwhile, the above-mentioned resistor $R_3$ is provided to reduce signals flowing through the control signal line to the variable capacity diodes $VC_1$ and $VC_2$ of the respective stages to prevent mutual interference between the variable capacity diodes $VC_1$ and $VC_2$ when the delay circuits 1 are connected in multiple stages.

Figure 9:
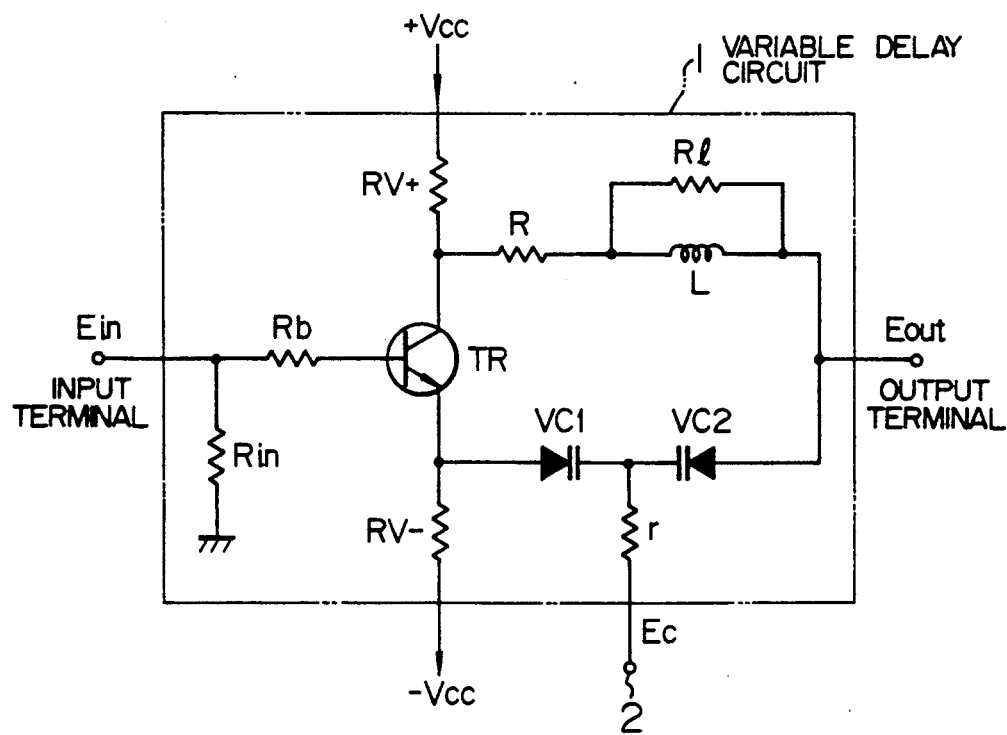
FIG. 9 is a structural diagram showing another embodiment of the delay circuit.

FIG. 9 shows a circuit diagram showing another embodiment of the variable delay circuit 1 according to the present invention. This variable delay circuit 1 continuously varies the delay time by an electric signal applied to the control terminal 2. As illustrated, the variable delay circuit 1 comprises a transistor Tr which receives an input signal Ein and outputs, respectively from the emitter and the collector thereof, a positive phase signal and a negative phase signal with respect to the input signal Ein, which signals have substantially equal amplitudes and a phase difference of 180° between them, a pair of variable capacity diodes $VC_1$ and $VC_2$, which receives at one end a positive phase signal from the emitter of the transistor Tr and the capacitance of which varies by the magnitude of the reverse voltage Ec, a resistor R which receives at one end the negative phase signal from the collector of the above-mentioned transistor Tr, and an inductor L connected in series with the other end of the resistor R and having the Q value adjusted to a low level. The variable delay circuit 1 supplies the output signal Eout from a connection between the other end of the above-mentioned pair of variable capacity diodes $VC_1$ and $VC_2$ and the other end of the inductor L, and varies the delay time according to a change in the reverse voltage applied to the above-mentioned variable capacity diodes $VC_1$ and $VC_2$. Incidentally, in FIG. 9, the two variable capacity diodes $VC_1$ and $VC_2$ have their cathodes connected together, and to this node a reverse voltage Ec is applied through a high resistance r. Either one of the above-mentioned variable capacity diodes $VC_1$ and $VC_2$ may be a fixed capacitor.

In FIG. 9, a symbol Rin denotes a resistor to give an electric potential to the base of the transistor Tr, Rb denotes a resistor to prevent oscillation, and R1 denotes a resistor connected in parallel with the above-mentioned inductor L. Load resistors $RV-$ and $RV+$ inserted in the circuits of the emitter and the collector of the transistor Tr are specified as having substantially the same resistance value so that the signal voltages at the emitter and the collector have the same amplitude. Therefore, the above-mentioned transistor Tr functions as the phase splitter.

Figure 5:
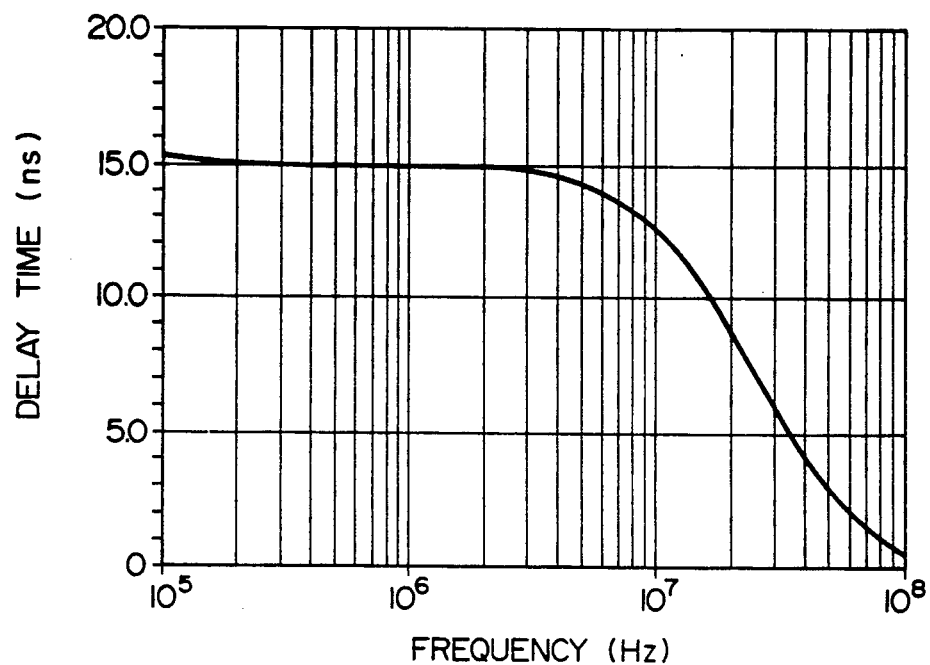
FIG. 5 is a frequency-delay time characteristics diagram of FIG. 3.
Figure 10:
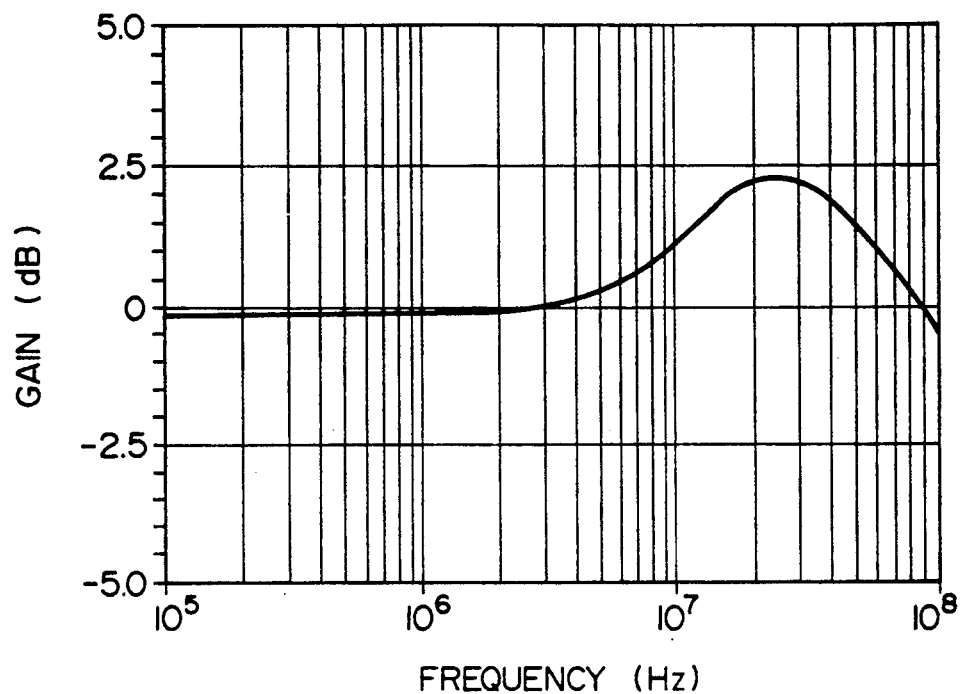
FIG. 10 is a frequency-gain characteristics of the delay circuit of FIG. 9.
Figure 11:
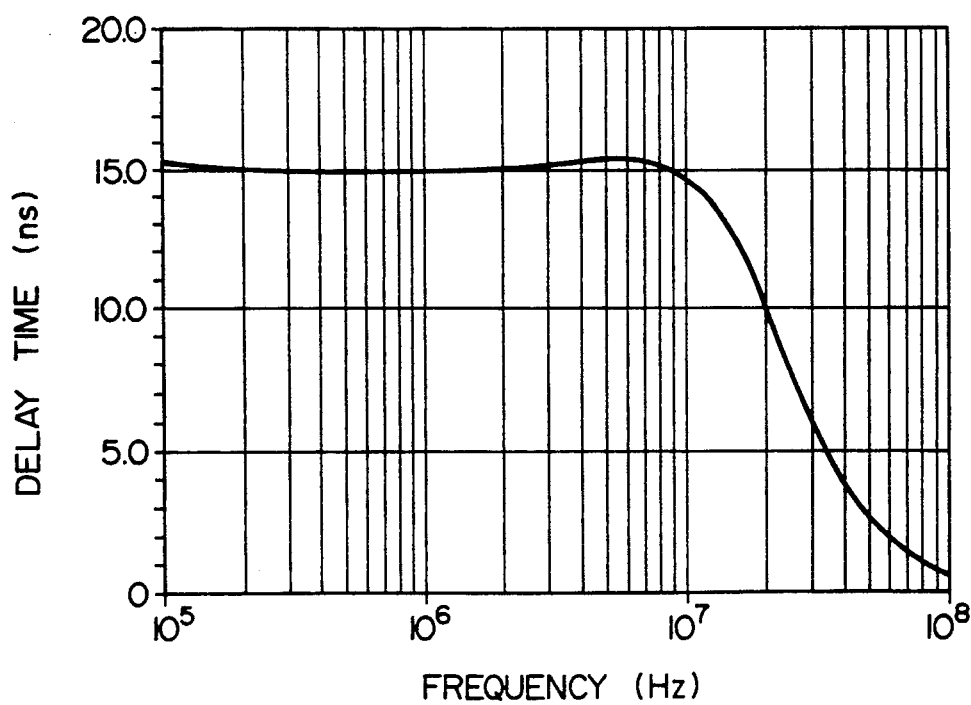
FIG. 11 is a frequency-delay time characteristics of the delay circuit of FIG. 9.

If in FIG. 9 the inductor L is 1 $\mu H$ and the resistor R1 is 100 $\Omega$, an example of calculations of the frequency-gain characteristics of the output voltage Eout with respect to the input voltage Ein with a fixed amplitude is shown in FIG. 10, and an example of calculations of the frequency-delay time characteristics is shown in FIG. 11. In the frequency-gain characteristics shown in FIG. 10, the gain is about 1.25 dB at a frequency of 10 MHz, which is somewhat larger than about 0.5 dB in the prior-art variable delay circuit. On the other hand, in the frequency-delay time characteristics in FIG. 11, the delay time decreases about 3% at a frequency of 10 MHz, which means a great improvement of the frequency characteristics from the about 15% time decrease in the frequency-delay time characteristics of the prior-art variable delay circuit shown in FIG. 5. In other words, in this embodiment, even if the signal frequency is increased to 10 MHz, for example, the decrease of the delay time can be suppressed to about 3%, that is, the upper limit of the frequencies that can maintain a substantially constant delay time can be raised.

Figure 12:
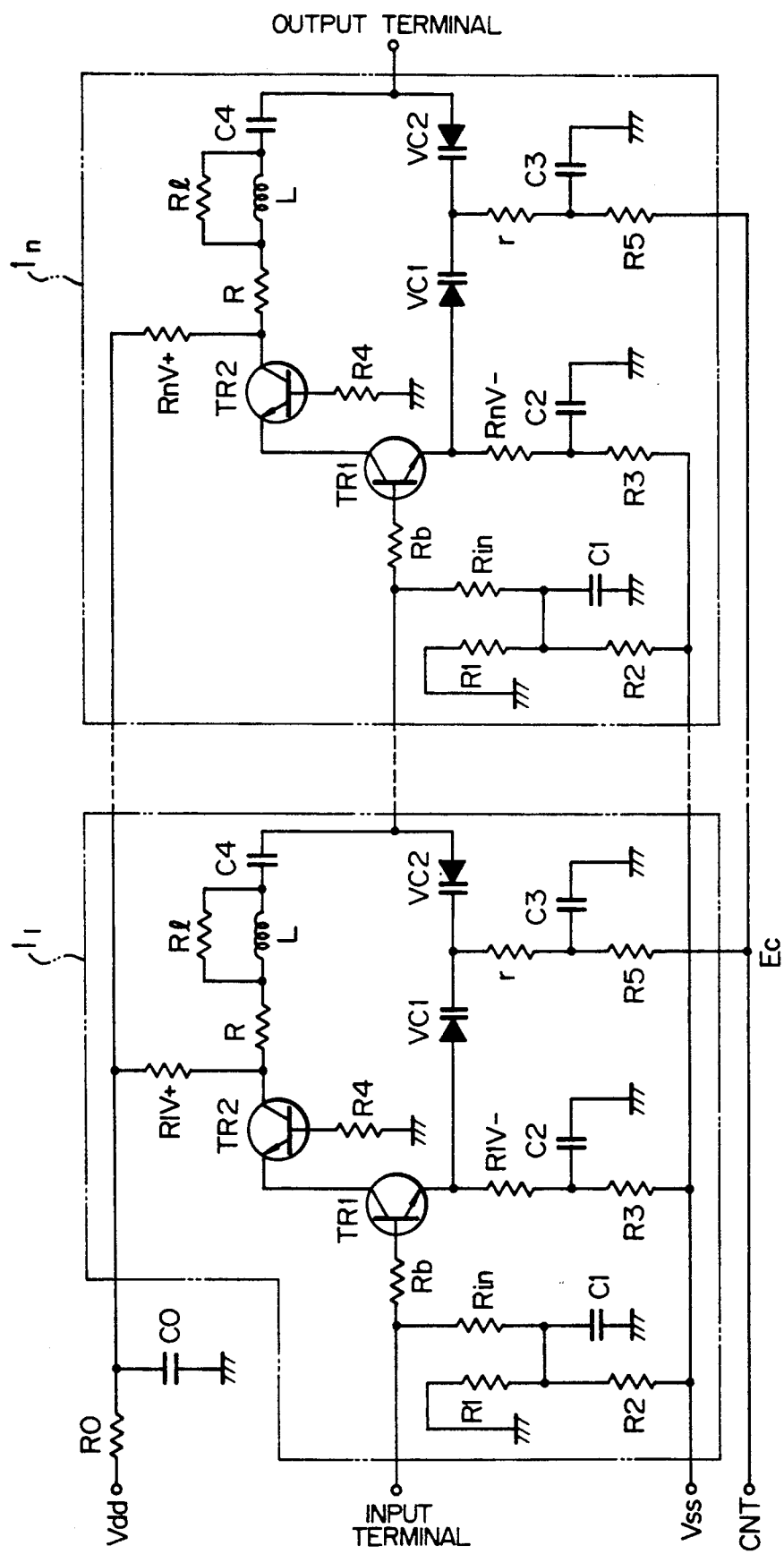
FIG. 12 is a diagram showing a structural example of unit variable delay circuits connected in multiple stages.

FIG. 12 is a circuit diagram showing a structural example of unit variable delay circuits connected in multiple stages used in practice as the delay circuits in the phasing circuit of an ultrasonic diagnosis apparatus, but each unit is a somewhat modified version of the variable delay circuit 1 shown in FIG. 9. In FIG. 12, the variable delay circuit $l_1$ is formed by using two transistors $Tr_1$ and $Tr_2$, and a common-base second transistor $Tr_2$ is connected to the collector (which outputs a negative phase signal) of the first transistor $Tr_1$ which receives the input signal from the base thereof. By this circuit structure, since the input impedance of the second transistor $Tr_2$ is as low as several ohms, the frequency characteristics can be prevented from deteriorating caused by the capacitance at the collector side of the first transistor $Tr_1$. By specifying the same value for a resistor $R_1-$ connected to the emitter of the first transistor $Tr_1$ and a resistor $R_1+$ connected to the collector of the second transistor $Tr_2$, the output signal at the emitter side and the output signal at the collector side of the first transistor $Tr_1$ can be made to have a substantially same amplitude and a phase difference of 180° between them.

In FIG. 12, symbols $R_1$ and $R_2$ denote resistors of a voltage divider for bias voltages, and $R_3$ denotes a resistor for setting the operating point of the first transistor $Tr_1$ at a predetermined value. A symbol $C_4$ denotes a coupling capacitor, and $C_0$, $C_2$, and $C_3$ denote decoupling capacitors. In addition, symbols $R_0$ and $R_5$ denote resistors for enhancing the effects of the above-mentioned decoupling capacitors $C_0$, $C_2$, and $C_3$. A symbol Vdd denotes a positive power source terminal, Vss denotes a negative power source terminal, and CNT denotes a control terminal for accepting an electric signal to control the delay time. In FIG. 12, variable delay circuits $l_1$, configured as described, are connected in cascade connection in n stages up to the ln stage.

FIG. 13 is a block diagram showing an example of an ultrasonic diagnosis apparatus having a received wave phasing circuit comprising a plurality of variable delay circuits shown in FIGS. 8 to 12.

The ultrasonic diagnosis apparatus is used to take a tomogram of the part of a patient's body which is under medical examination by using the ultrasonic waves. Here, an electronic linear scanning type is shown as an example.

The ultrasonic diagnosis apparatus of this electronic linear scanning type, as shown in FIG. 13, comprises a probe, having a plurality of oscillator elements 511, 512, ..., 51n arranged in a linear form, for sending and receiving the ultrasonic waves, a set of switches 53 for sequentially switching over one set to another of a specified number of adjacent oscillator elements (sets of oscillator elements) of the oscillator elements 511, 512, ..., 51n of the probe 52, and a plurality of amplifiers 54a to 54e for accepting the received wave signals from respective sets of oscillators formed from among the oscillator elements 511, 512, ..., 51n of the probe 52 through the set of switches 53, increasing the gain with passage of time, and correcting the signal intensity according to the measuring depths.

The above-mentioned ultrasonic diagnosis apparatus further comprises a received wave phasing circuit 57 including a plurality of delay circuits 55a to 55e for giving predetermined delay times to the output signals from the above-mentioned amplifiers 54a to 54e and an adder 56 for adding the received wave signals whose phase has been matched, and still further comprises a detector 58 for detecting the signals phase-matched by the received wave phasing circuit 57, and a display device for displaying the output signals from the detector 58 as an image.

In the example illustrated, the set of switches 53 operates to connect adjacent five oscillator elements to the five amplifiers 54a to 54e at the next stage in such a manner as shifting a set of five adjacent oscillator elements by one oscillator element to another set of five adjacent oscillator elements and by repeating this process from one end to the other end of the oscillator element array.

The operation of the above-mentioned amplifiers 54a to 54e is controlled by a control signal S1 from the control circuit 60.

As has been described, in the present invention, variable delay circuits shown in FIGS. 8 to 12 are used as the delay circuits 55a to 55e in the received wave phasing circuit 57, and each delay time is continuously varied by a control signal S2 (reverse voltage Ec) input to the control terminal (capacity control analog signal input terminal CNT1).

The delay circuits 55a to 55e, in the illustrated example, are provided as many as the five amplifiers 54a to 54e, and are controlled so as to move the converging point of the ultrasonic beam to a deeper place with passage of time by the control signal S2 from the control circuit 60.

By this arrangement, in the electronic linear scanning ultrasonic diagnosis apparatus, the delay circuits 55a to 55e in the received wave phasing circuit 57 continuously vary the delay times only by an electric signal applied to the control terminals thereof, so that dynamic focusing can be achieved which continuously moves the converging point of the ultrasonic waves only by the received wave phasing circuit 57 of one system.

Figure 14A:
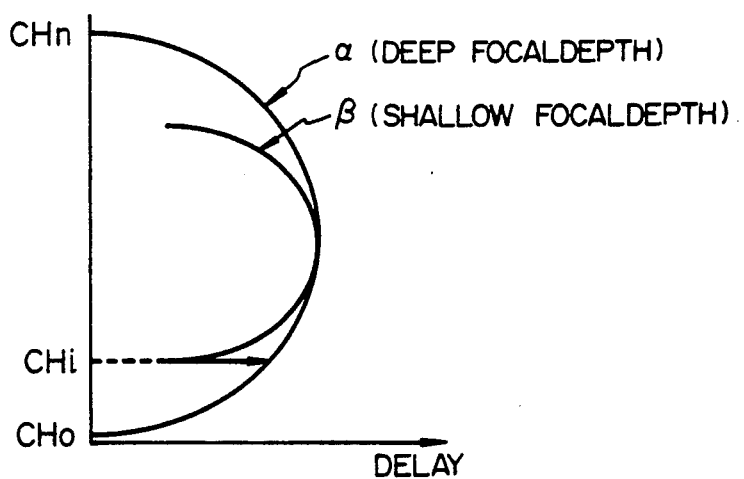
FIGS. 14A, 14B, and 14C are diagrams for explaining the patterns of control signals for variable delay control.
Figure 14B:
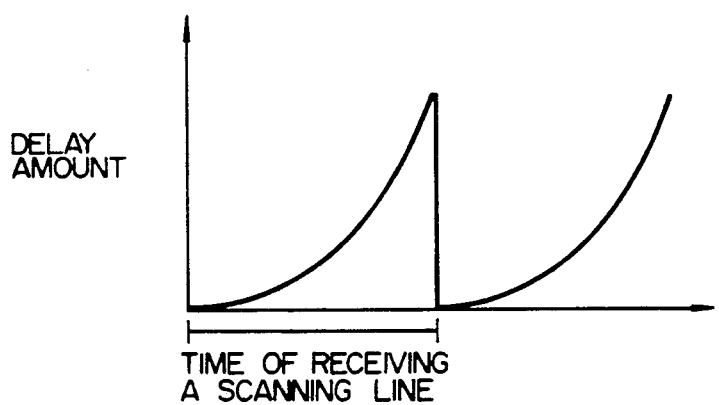
Figure 14C:
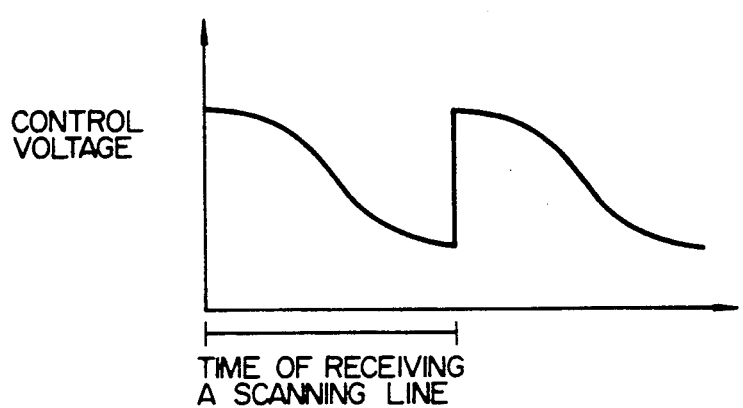

With reference to FIGS. 14A to 14C, description will now be made of variable delay control of the variable delay circuits 55a to 55e by a control signal S2 from the control circuit 60. The necessary delay amount curve for each delay circuit is defined depending on when the depth of focus is deep ($\alpha$) or deep ($\beta$) as shown in FIG. 14A.

At CHi, for example, to sequentially move the focal point to a deeper place, it is necessary to increase the delay amount continuously. The time chart of delay amount in this case is shown in FIG. 14B. The control circuit 60 applies the voltage shown in the time chart of FIG. 14C so that the variable delay circuits 55a to 55e provide the respective channels with necessary delay amounts.

In the above-described embodiment, the cathodes of the variable capacity diodes are connected together, but it is possible to make an arrangement in which their anodes are connected together. In this case, the control voltage applied to the junction between the anodes is in a waveform which has the opposite polarity from that shown in FIG. 14C.

Figure 15:
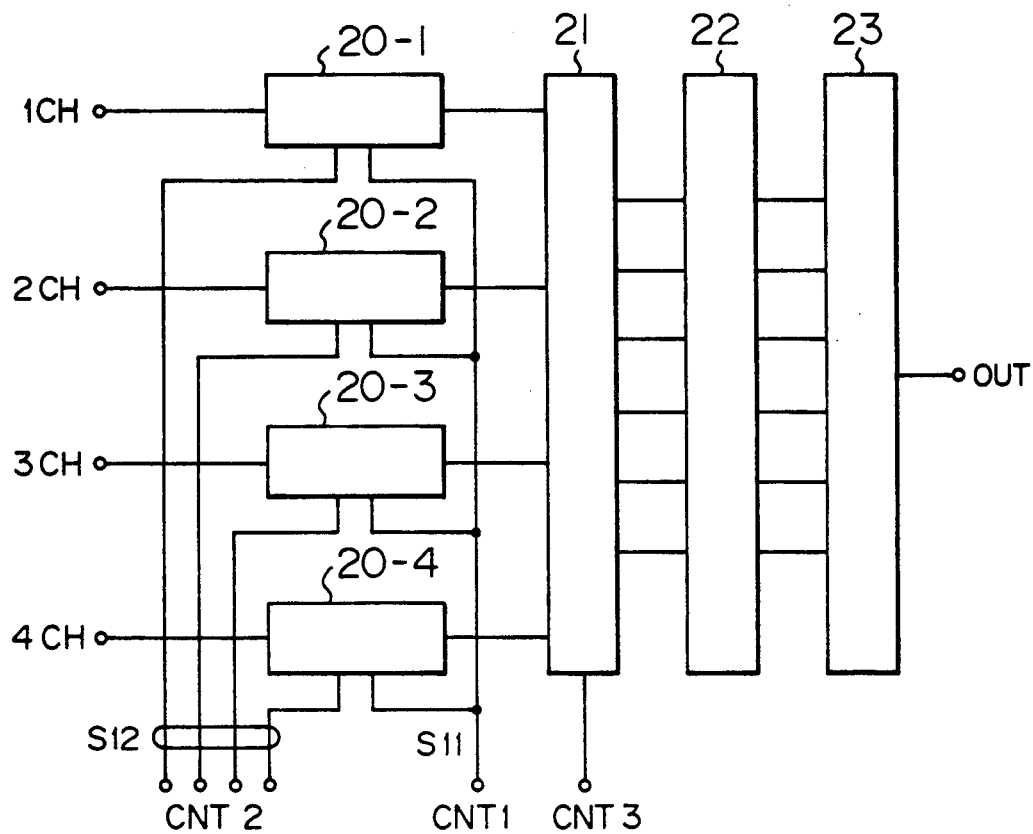
FIG. 15 is a block diagram showing a structural example of a received wave phasing circuit with taps.

FIG. 15 is a block diagram showing a structural example of the above-mentioned received wave phasing circuit 57. In FIG. 15, numerals 20-1 to 20-4 denote variable delay circuits, 21 denotes a selector, 22 denotes a fixed delay line, 23 denotes an adder, 1CH to 4CH denote input terminals of received waves each from a specified number of oscillator elements (sets of oscillator elements), OUT denotes a phasing output, CNT1 denotes an input terminal of a control signal (capacity control analog signal) for common use to the variable delay circuits, CNT2 denotes tap selection control signal input terminals for the variable delay circuits 20-1 to 20-4, and CNT3 denotes a terminal for control signal of the above-mentioned selector 21. The variable delay circuit with taps will be described layer.

In this circuit configuration, by the capacity control analog signal S11 from the terminal CNT1, the delay times of the variable delay circuits 20-1 to 20-4 can be varied continuously, thus making dynamic focusing possible.

The selector 21 and the fixed delay line 22 are used chiefly for deflecting the ultrasonic beam, but their detailed description is omitted.

According to the circuit configuration in FIG. 15, a common control signal line (terminal CNT1) for variable delay times of the variable delay circuits 20-1 to 20-4 is used for the four grouped channels (a set of oscillator elements), and therefore, this control signal circuit can be one-fourth of the circuit size when independent control signal lines are provided on the side of the control circuit (control signal generating circuit), not shown. Normally, the above-mentioned control circuit would otherwise requires a memory and a D/A converter for every variable delay time control line (terminal CNT1), so that the above-mentioned simplified circuit configuration contributes a great deal to the simplification of the whole circuit.

Further, because the capacity control analog signal input terminal CNT1 is in common use among the channels 1 to 4 (1CH to 4CH), to set different delay times among the channels (groups of oscillator elements) as initial states, it is only necessary to independently control the individual channels (groups of oscillator elements) by separate tap selection control signals CNT2. Since the tap selection control signal CNT2 is controlled digitally, even if the circuit is arranged so that an independent control signal S12 is input for every tap selection control signal CNT2, the circuit configuration does not become more complicated than in a case where an independent control signal is input for every capacity control analog signal CNT1.

Another embodiment of the ultrasonic diagnosis apparatus will be described according to disclosures shown in FIG. 16 and subsequent figures.

Figure 16:
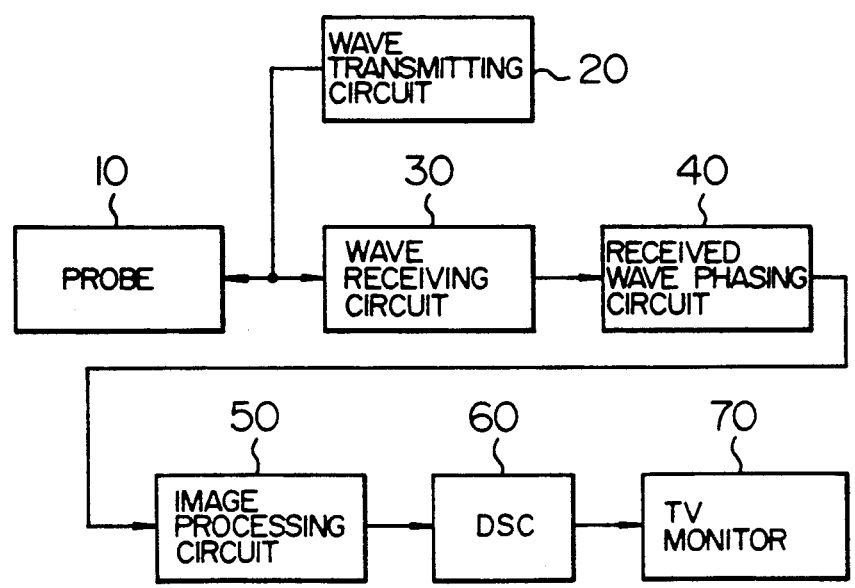
FIG. 16 is a block diagram showing the ultrasonic diagnosis apparatus according to another embodiment.

FIG. 16 is a block diagram showing another embodiment of the ultrasonic diagnosis apparatus according to the present invention. The oscillators of the ultrasonic probe 10 used by being placed against the examined body are driven by output from a wave transmitting circuit 20, and the ultrasonic waves are transmitted into the examined body and reflected back from inside the examined body into the ultrasonic probe 10, which now supplies output into a wave receiving circuit 30.

The output from the receiving circuit 30 is then input into a received wave phasing circuit 4. This received wave phasing circuit 4 is arranged to perform focusing on the received waves by giving predetermined delays to the respective outputs of the oscillators, and adding the received waves. The detailed configuration of the received wave phasing circuit 4 will be described in greater detail later with reference to FIGS. 17 and 23.

Output from the received wave phasing circuit 4 is input to an image processing circuit 50, which performs image processing on the received waves in a suitable manner.

Output from the image processing circuit 50 is input to a DSC (digital scan converter) 60, in which digitized signals are written in memory, then read out, converted into analog signals, and finally output as a TV signal.

The TV signal from DSC 60 is sent to a TV monitor 70, and displayed as a tomogram of the examined body on the display screen.

Figure 17:
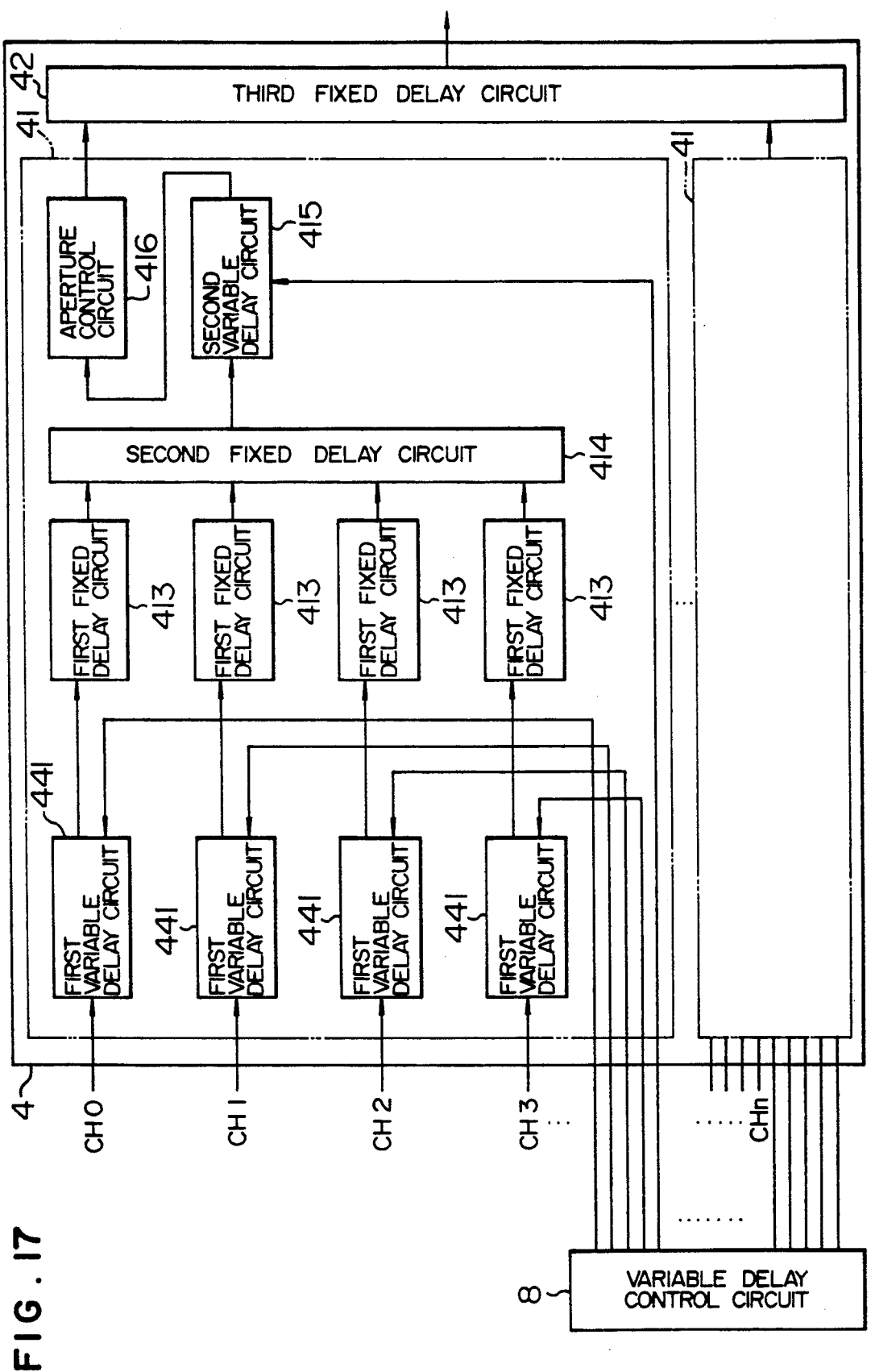
FIG. 17 is a structural diagram of the received wave phasing circuit used in the ultrasonic diagnosis apparatus of FIG. 16.

FIG. 17 is a block diagram showing an embodiment of the above-mentioned received wave phasing circuit 4.

The received wave phasing circuit 4 comprises a delay circuit section 41 including a first variable delay circuits 441, first fixed delay circuits 413, a second fixed delay circuit 413, a second variable delay circuit 415, and an aperture control circuit 416, and a third fixed delay circuit 42.

A variable delay control circuit 8 supplies the respective channels with control signals to control delay amounts of the first variable delay circuits 441 and the second variable delay circuits 415.

Figure 1:
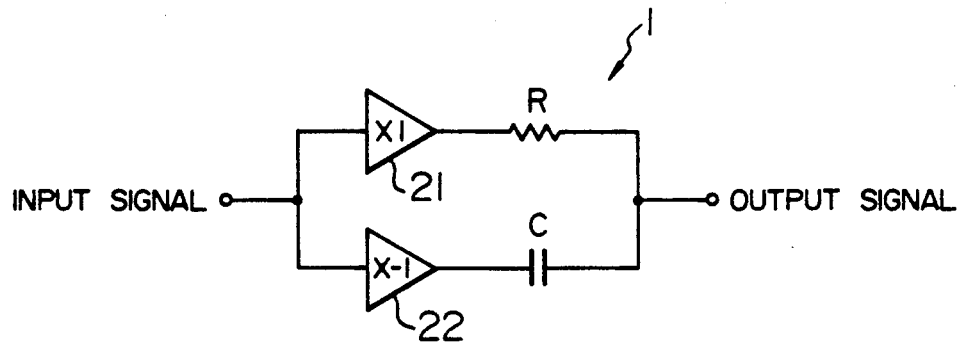
FIG. 1 is a diagram showing the principle of the RC delay element.
Figure 2:
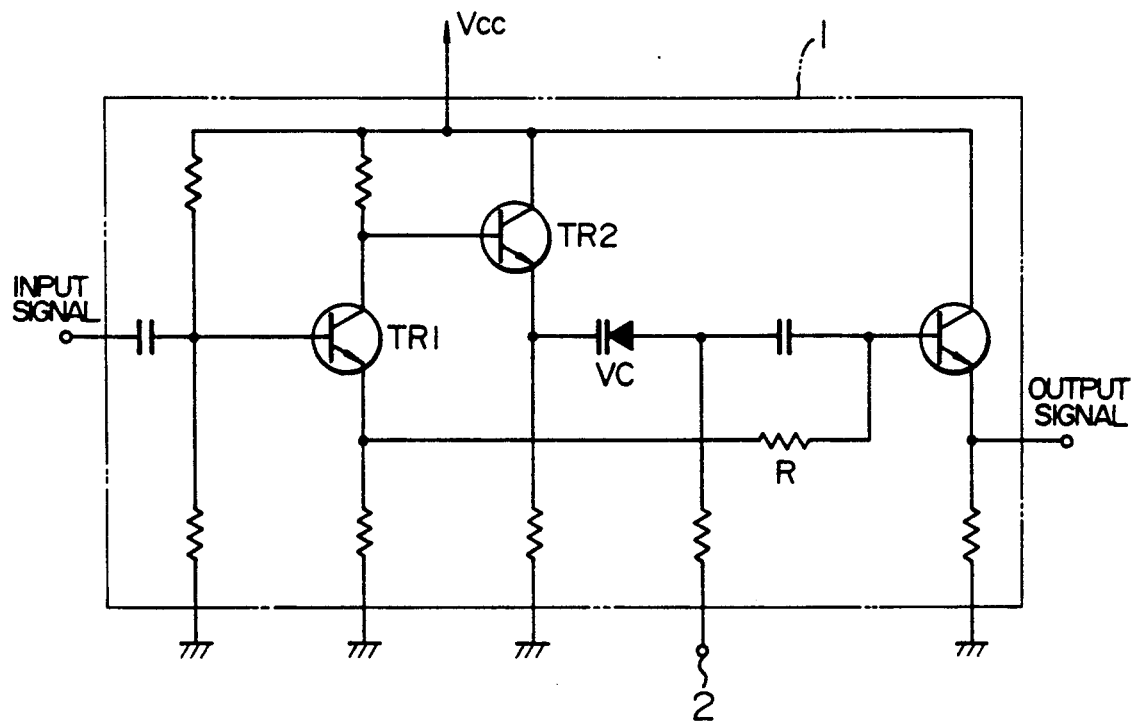
FIG. 2 is a diagram showing a prior-art example of the delay circuit.
Figure 3:
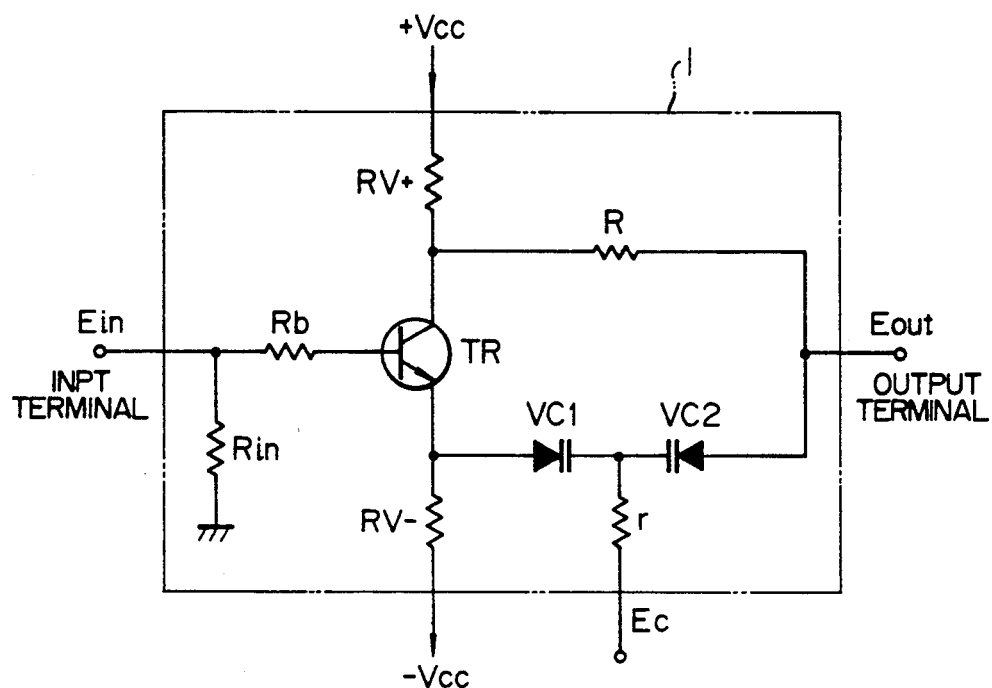
FIG. 3 is a structural diagram of another prior-art delay circuit.
Figure 4:
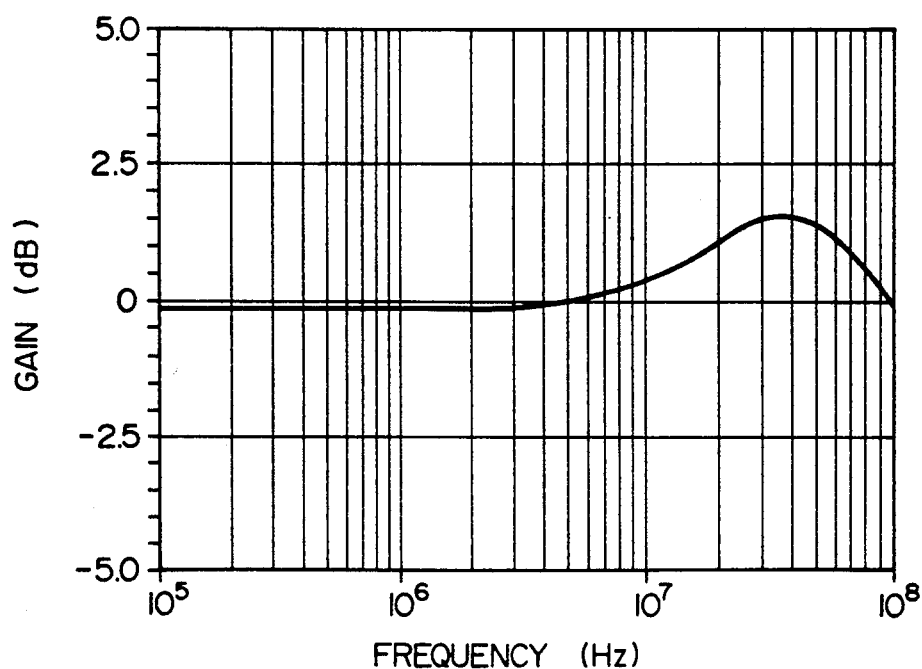
FIG. 4 is a frequency-gain characteristics diagram of FIG. 3.

In the embodiment in FIG. 3 of the received wave phasing circuit 57 mentioned above, the delay amounts of the respective channels are given by the variable delay circuits 55a to 55e provided independently for the respective channels. In the received wave phasing circuit 4 in FIG. 17, dynamic focusing is performed by sums of the delay amounts of the first variable delay circuits 441 and the second variable delay circuits 415 for the separate channels. At this time, the specified delay amounts are set in the second variable delay circuit 415 by considering the maximum required delay amount in the four channels and delay amounts of the respective channels, and displacement amounts to be added to the respective channels are set in the first variable delay circuits 441 provided for the respective channels.

Control signals for dynamic focusing from the variable control circuit 8 can be obtained by supplying control voltages as shown in FIGS. 14A, 14B, and 14C to the respective channels.

Figure 18:
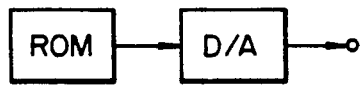
FIGS. 18 and 19 are diagrams showing structural examples of the variable delay control signal generating circuit.
Figure 19:

As the variable delay control signal generating circuit in the variable delay control circuit 8, a circuit as shown in FIG. 18 or 19 is used. In FIG. 18, the circuit converts data from a read only memory (ROM) into an analog signal by a D/A converter. By storing data on variable delay in the read only memory (ROM), a variable delay control signal can be generated. In FIG. 19, a CPU and a data latch circuit are used in place of the read only memory (ROM) shown in FIG. 18, so that the variable delay control signal can be directly controlled by CPU. The above-mentioned data latch circuit temporarily stores data from CPU. FIGS. 18 and 19 show block diagrams of a variable delay control signal generating circuit for one channel. In practice, a plurality of the above-mentioned circuit are required.

Figure 20:
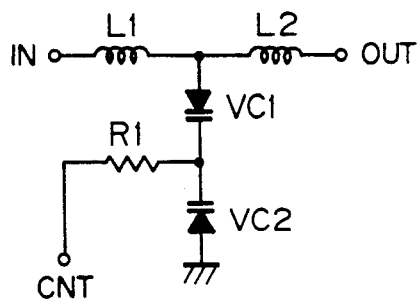
FIGS. 20 and 21 are diagrams showing structural examples of the variable delay circuit.
Figure 21:
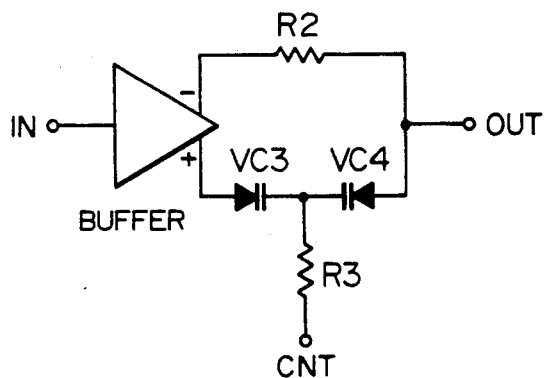

As the variable delay circuit, any of the circuits shown in FIGS. 8, 9, 12, 20 and 21 is used. In FIG. 20, symbols $VC_1$ and $VC_2$ denote variable capacity diodes (variable capacitors), and by giving a CNT signal through R1, and in combination with L1 and L2, the capacity is varied and the amount of delay ca be changed. By connecting a number of this circuit in series, a variable delay circuit can be formed. In FIGS. 21, $VC_3$ and $VC_4$ denote variable capacity diodes, and the capacity can be changed by giving a CNT signal through R3. From the buffer, a signal in phase with the IN signal and a signal 180° out of phase with the IN signal are output, and by varying the capacity of $VC_3$ and $VC_4$, an OUT signal having a phase different from the IN signal can be output. By varying the phase, the signal is delayed. By connecting a number of this circuit in series, a variable delay circuit can be formed. Those variable delay circuits are more complicated than the prior-art fixed delay circuit, so that the frequency characteristics are not so good, and becomes worse as the variable delay amount increases. In addition, since delay amount control is performed by a variable delay control signal, the accuracy of delay amount is not so high. If the fixed delay circuits of the prior-art received wave phasing circuit are simply replaced by variable delay circuits, the frequency characteristics become worse and signals can hardly pass, while the delay amount accuracy is low, and the delay circuits show a poor performance. In contrast, in the circuit configurations in FIGS. 17 and 23, the variable delay circuits are required to provide very small delay amounts, so that the frequency characteristics are hardly subject to deterioration. Moreover, only the delay in focusing is varied, which is favorable for the frequency characteristics.

Figure 22:
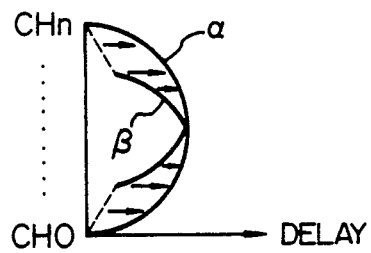
FIG. 22 is a diagram showing the difference of delay amount by focusing.
Figure 23:
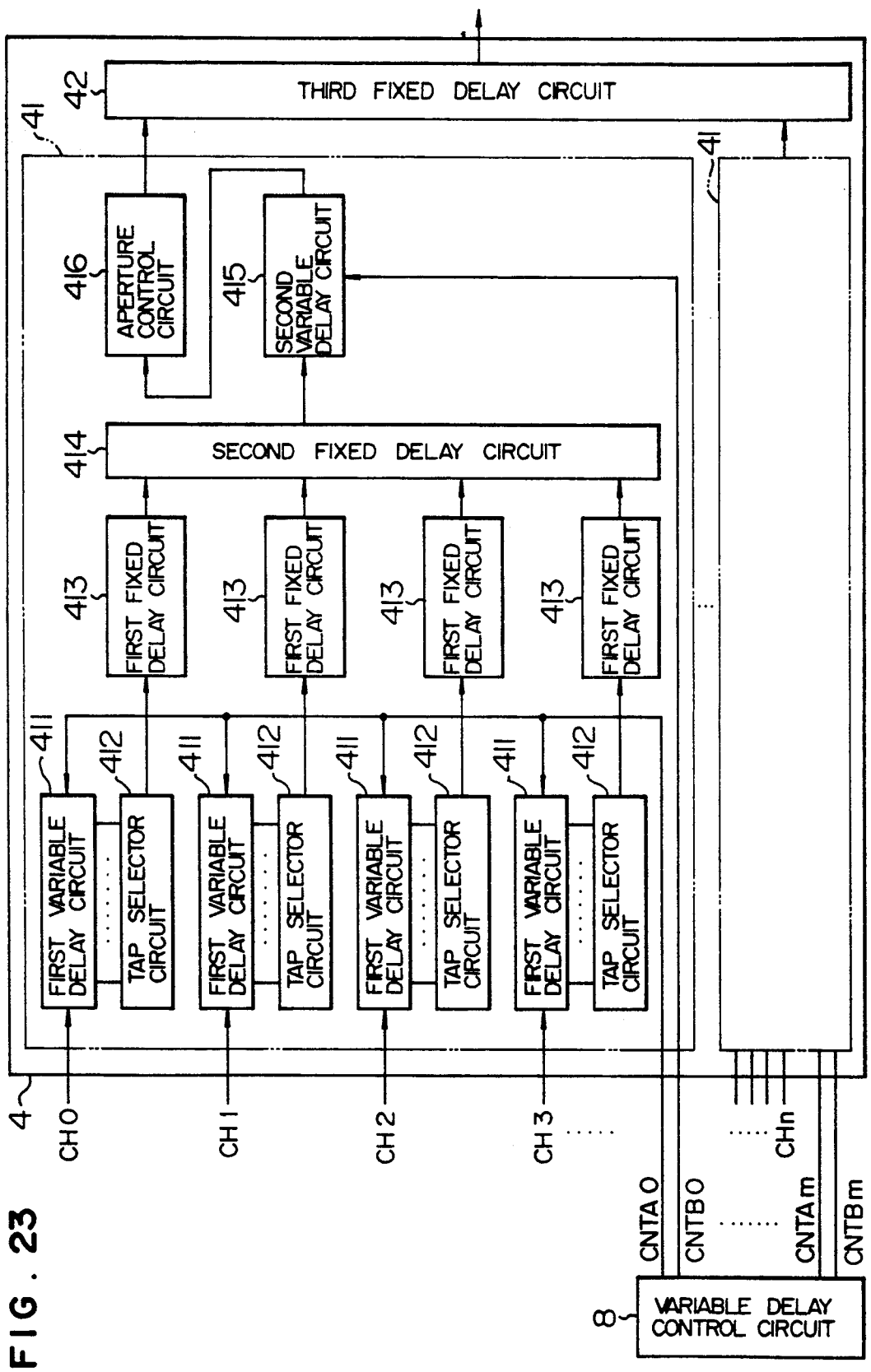
FIG. 23 is a diagram showing yet another received wave phasing circuit.

FIG. 22 shows a difference in the delay amount by focusing. In FIG. 22, $\beta$ indicates a curve showing the delay amount when the depth of focus is shallow, while $\alpha$ indicates a curve showing the delay amount when the depth of focus is deep. The delay amounts indicated by arrows are the variable delay amounts. At the middle of the channels, the variable amounts of delay are smallest. In other words, at the center of the aperture, the variable amounts of delay are small, so that the frequency characteristics of the variable delay circuits are not adversely affected by changes in the delay amount. At the shallow portion, since there is little change in the variable delay, the frequency characteristics are free from adverse effects by changes in the delay amount. The ultrasonic waves attenuate notably in a living body at higher frequencies, so that the high frequency signal can be obtained when it is transmitted to a shallow portion, but the frequency of the signal decreases as the waves are transmitted to a deep portion. Therefore, the fact that the frequency characteristics of the variable delay circuit do not deteriorate at shallow depths is very convenient. FIG. 23 shows another embodiment of the received wave phasing circuit 4.

In FIG. 23, the received wave phasing circuit 4 comprises a delay circuit section including first variable delay circuits 411, tap selector circuits 412, first fixed delay circuits 413, a second fixed delay circuit 414, a second variable delay circuit 415, and an aperture control circuit 416, and a third fixed delay circuit 42.

Control signals CNTA0 to CNTBm are input from the variable delay control circuit 8 to the first variable delay circuits 411 and the second variable delay circuit to control their delay amounts.

As it will be clear by comparison with FIG. 17 that a feature of this embodiment is that there are provided the first variable delay circuits 411, the tap selector circuits 412, the second variable delay circuits 415, and the variable delay control circuit 8.

The received wave signals CH0 to CH3 supplied through the four channels from the receiving circuit 30 are input to the delay circuit section 41 in FIG. 23. The above-mentioned signals through the four channels are given predetermined delays by the first variable delay circuits 411, the tap selector circuits 412, the first fixed delay circuits 413, and the second fixed delay circuit 414, and then added together by the second fixed delay circuit 414. The signals from the second fixed delay circuit 414 are sent through the second variable delay circuit 415 and the aperture control circuit 416 to the third fixed delay circuit 42.

The control signals CNTA0 to CNTBm are supplied from the variable delay control circuit 8 to the first variable delay circuits 411 and the second variable delay circuit 415, so that focus control is performed in dynamic focusing on the continuously received waves.

In the received wave phasing circuit in the above-mentioned embodiment, the individual outputs from the oscillators arranged in the ultrasonic probe are first input to the variable delay circuits (e.g. the first variable delay circuits 411) capable of varying the focus during the reception period, and the outputs from the variable delay circuits are then input to the conventional fixed delay circuits (e.g. the first fixed delay circuits 413) capable of changing the scanning direction other than during the reception period.

By this circuit configuration, the scanning direction can be changed by stepped switching by the fixed delay circuits as in the prior art, but since this switching is done other than during the reception period, noise generated by the stepped switching does not cause any problem.

The focus can be changed during the reception period, but this is done by smoother change-over by the variable delay circuits, in other words, the focus can be changed without switching. Consequently, a stepped-pattern image never occurs, and noise caused by switching is precluded.

In the circuit configuration in FIG. 23, the delay of the scanning direction (deflection) of the ultrasonic beam is the job assigned to the fixed delay circuits, so that the delay of focus is the only job assigned to the variable delay circuits. As a result, the delay amount accuracy is substantially governed by the fixed delay circuits conventionally used. Therefore, it never occurs that the above-mentioned circuit configuration causes a deterioration of the delay amount accuracy. For this reason, by the adoption of the circuit configuration shown in FIG. 23, it becomes possible to use the variable delay circuit in FIG. 20 or 21, which hitherto could not be used because of the inferior quality of the frequency characteristics and the delay amount accuracy.

The first variable delay circuits 411 shown in FIG. 23 are provided with taps, any one of which can be selected with the tap selector circuit 412. Furthermore, the variable delay control signal CNTA0 from the variable delay control circuit 8 is input to each of the four first variable delay circuits 411 in FIG. 23.

Therefore, since a delayed signal in each variable delay circuit is selected arbitrarily by a selector as an output signal, the delay time in initial state and the extent of change of the delay time can be selected arbitrarily, so that the number of variable delay control signals can be reduced.

The first variable delay circuit 411 varies only the delay amount that can be changed for focusing at one corresponding channel. Normally, the range of change of about 100 ns is sufficient. On the other hand, the second variable delay circuit varies only the delay amount that can be changed for focusing of every four channels, for which normally the range of change of about 200 ns is sufficient. For a received wave phasing circuit connectable with an electronic sector probe, normally, the delay amount of about 6000 to 13000 ns is required. From this, it is understood that in the circuit configuration in FIG. 23, only a very small amount of variable delay is required.

Figure 24:
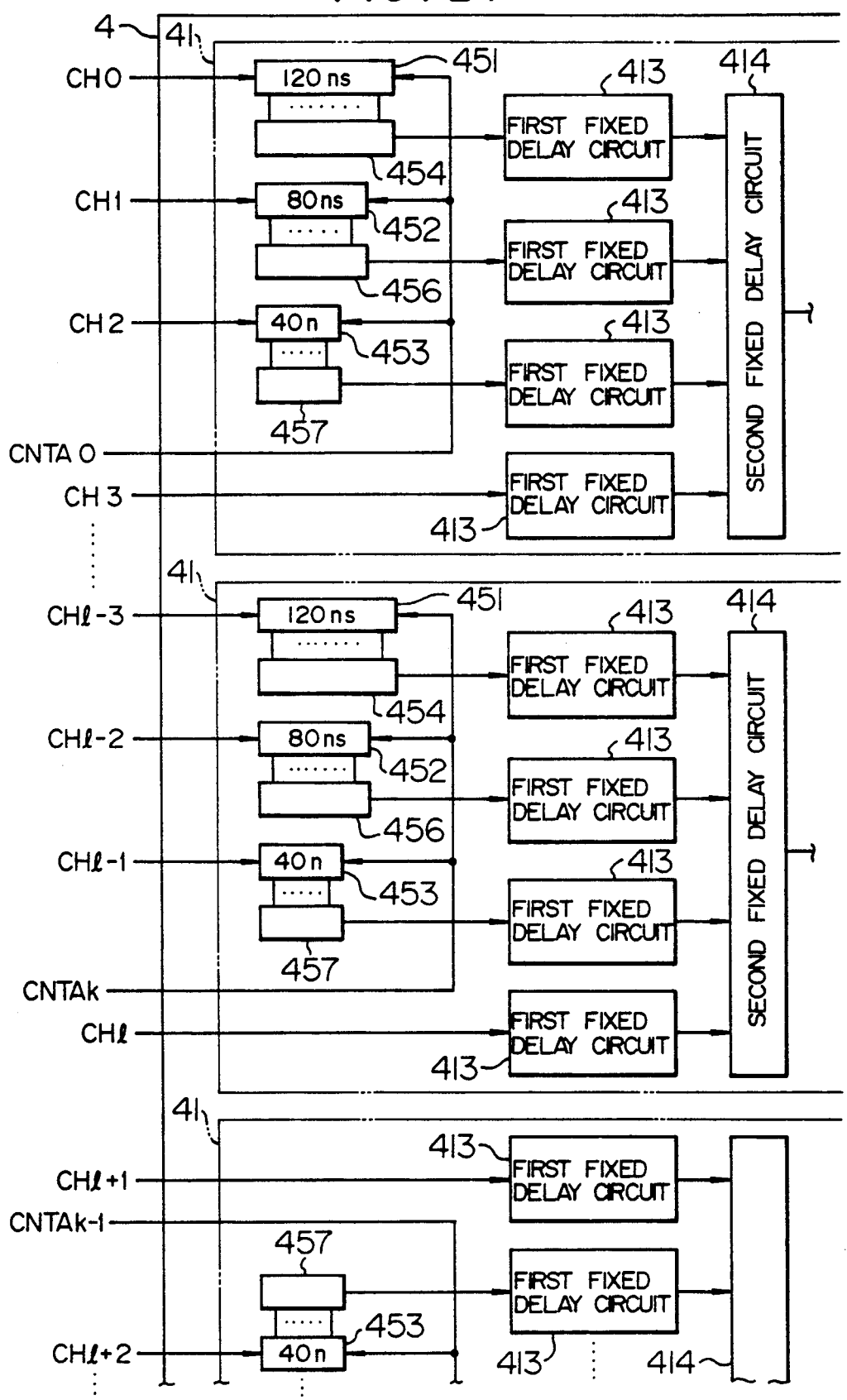
FIG. 24 is a diagram showing a still further received wave phasing circuit.

In FIG. 23, when the amount of change is at CH0 is small, if CH0 is used as the standard of change and the variable delay amount to be varied by the first variable delay circuit which is receiving a CH0 input signal is varied by the second variable delay circuit 415, the first variable delay circuit 411 and the tap selector circuit 412 are not required for CH0 and the CH0 input signal can be input directly to the first fixed delay circuit 413. Since there is not much difference in the delay amount to be varied among the different channels, it is possible to reduce the variable delay amounts also at the other first variable delay circuits to which CH1 and CH2 input signals are supplied. FIG. 24 shows a block diagram showing a case where the first variable delay circuits are provided at steps of 40 ns. As shown in FIG. 24, since the focus is symmetric with respect to the center of the aperture, it is necessary to set the variable delay amounts in such a way that the delay amount at the first variable delay circuit for the channel corresponding to the center of the aperture is zero, and the delay amounts are increased as the first variable delay circuits go away from the the center of the aperture. In the circuit configuration in FIG. 24, the number of variable delay circuits can be further reduced.

Meanwhile, CH1 denotes the central one of the channels and means the relation of $l = n/2$. Likewise, CNTAk denotes the central one of the variable delay control signals, and k means the relation of $k = m/2$. (l : center of aperture, n : number of oscillators, m : number of blocks)

Figure 25:
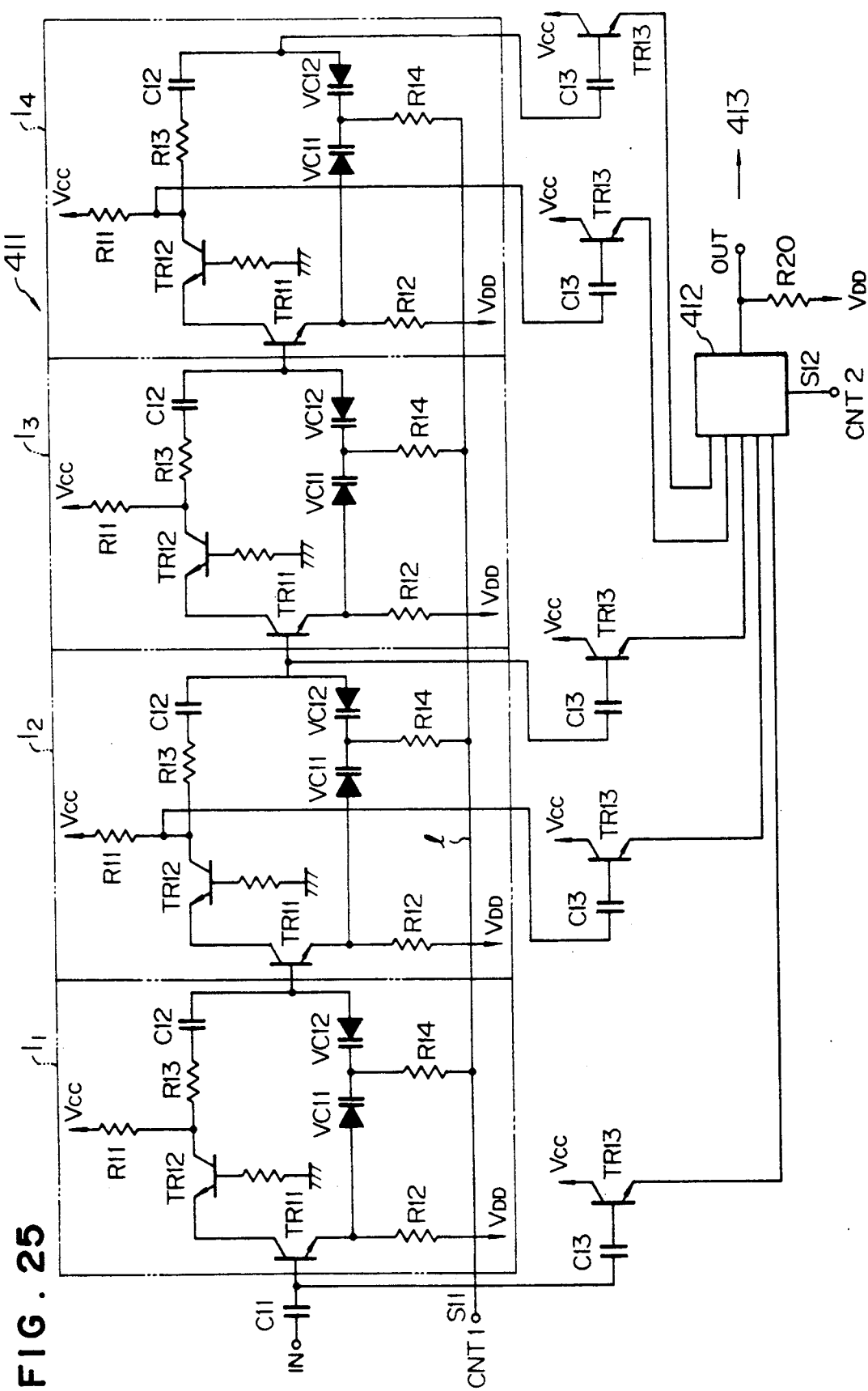
FIG. 25 is a diagram showing a structural example of the delay circuits connected in multiple stages.

FIGS. 25-and 26 are examples of detailed circuit configuration in which a tap selector circuit shown in FIG. 22 or 23 and the variable delay elements are combined.

In FIG. 25, $l_1$ to $l_4$ denote the variable delay elements (variable delay lines) as component units, 412 denotes a tap selector, IN denotes a signal input terminal, OUT denotes a signal output terminal, CNTi denotes an input terminal of the capacity control analog signal S11, and CNT2 denotes an input terminal of the control signal (tap selection control signal) S12 of a tap selector 412.

In FIG. 25, TR11 and TR13 denote transistors, C11 to C13 denote capacitors, and R11 to R13 and R20 denote resistors.

In FIG. 25, the same symbols as in FIGS. 22 and 23 denotes the same or equivalent parts.

In the variable delay circuit in FIG. 25, the delay times can be varied continuously by a capacity control analog signal S11 from the terminal CNT1.

Output signals from the variable delay elements $l_1$ to $l_4$ are passed through the high input impedance circuits, and undergo selection by a the tap selector 412, and are output from the output terminal OUT. At the variable delay elements $l_1$ to $l_4$, inputs and outputs are inverted in polarity, and therefore, output signals of the first and third stages are further inverted in polarity by the subsequent transistors, so that those output signals have the same polarity.

The above-mentioned high input impedance circuits are formed by transistors TR13 and a resistor R20 in such a way that the respective high input impedance circuits function as emitter followers. The resistor 20 serves as a common resistor for those high input impedance circuits, which arrangement is made to reduce power consumption.

Figure 26:
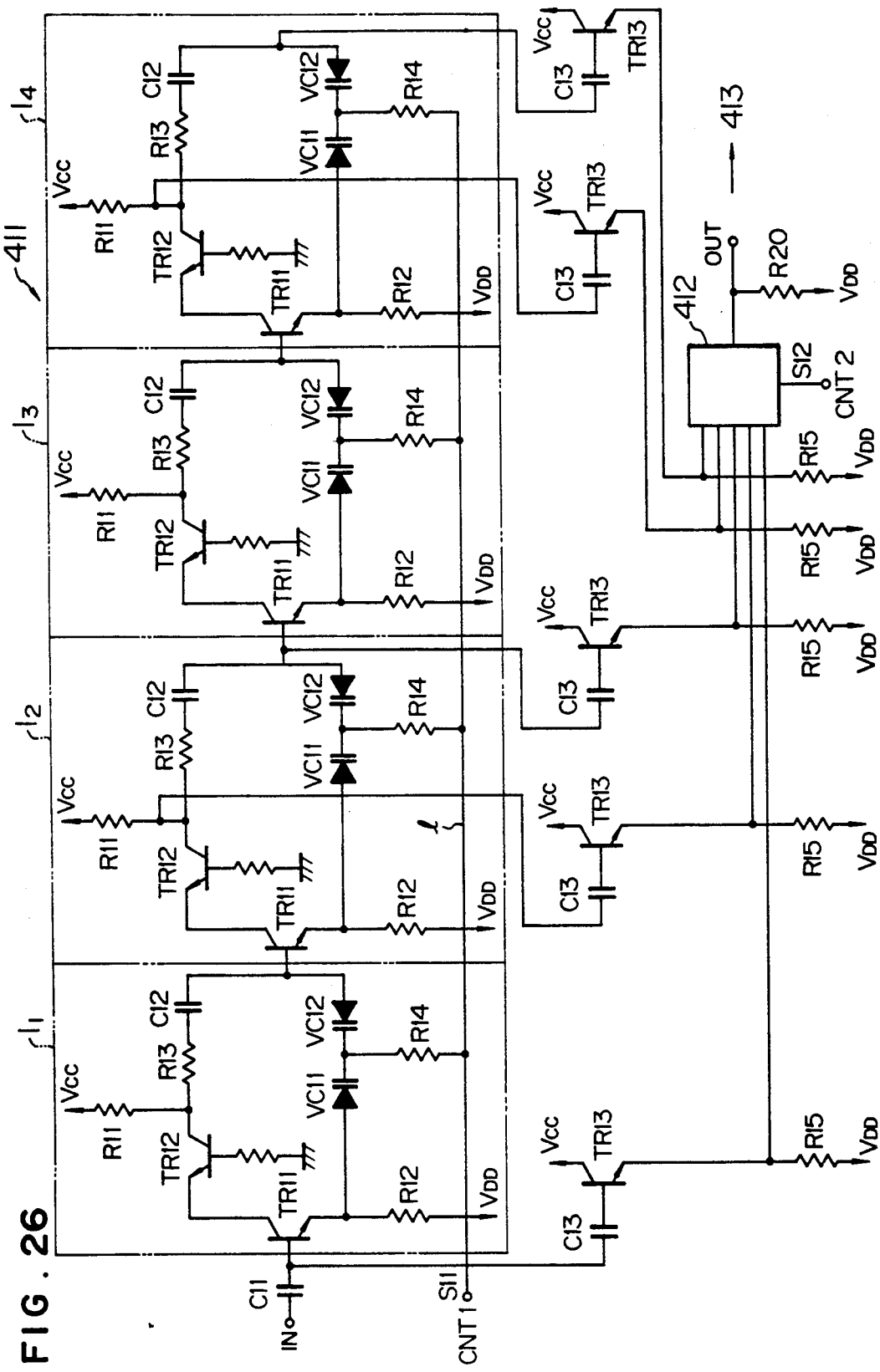
FIG. 26 is a diagram showing another structural example of the delay circuits connected in multiple stages like in the above example.

Further, in FIG. 25, it has been confirmed by experiment that when a certain transistor TR13 is selected and if the transistor TR13 is conducting, the impedance seen from the base side is high, and if the transistor TR13 is not conducting, its input impedance is lower than when it is conducting. In this case, as shown in FIG. 26, a possible embodiment is such that the unselected transistors TR13 are also put in the conducting state, and a high resistance R15 is inserted between the nodes of the emitters of the respective transistors TR13 and the input terminals of the tap selector 412, and the power sources $V_{DD}$, which arrangement is intended not to increase power consumption. In FIG. 26, the same symbols as in FIG. 25 denote the same parts.

This system is compatible with any scanning types, including linear, convex, and sector.

If a plurality of circuits of this system are provided, multiple reception can be achieved, the frame rate can be increased, and the scanning line density can be improved.

It ought to be noted that the above embodiment can be applied to the structure of the minimum unit of the received wave phasing circuit. To be more specific, the minimum unit of the received wave phasing circuit comprises a plurality of delay circuits for receiving outputs from the oscillators arranged in the ultrasonic probe, and an adder circuit for adding the outputs from the delay circuits, to this type of circuit configuration, this embodiment can be applied.

We claim:

1. A delay circuit comprising:
  a transistor for receiving a signal to be delayed from the base connected with an input terminal, and outputting a positive phase signal and a negative phase signal with respect to the signal from said input terminal, respectively from the emitter and the collector thereof, said collector connected to one end of a specified resistance;
  first and second variable capacity diodes with one set of common terminals of a same polarity connected together and a variable control voltage applied to the point of said connection for controlling a delay time of said delay circuit, a terminal of said first diode having an opposite polarity form said common terminals being connected to the emitter of said transistor; and
  a delay signal output terminal connected to the other end of said specified resistance and to a terminal of said second diode having an opposite polarity from said common terminals.

2. A delay circuit according to claim 1, wherein an inductor with a specified Q value is connected in series with said specified resistance and said delayed signal output terminal.

3. A delay circuit according to claim 1, further comprising a second transistor inserted between said transistor and said specified resistance with a base grounded, an emitter connected to the collector of said transistor, and a collector connected to said one end of said specified resistance.

4. A delay circuit comprising:
  a transistor for receiving a signal to be delayed from an input terminal, and outputting a positive phase signal and a negative phase signal with respect to the signal from said input terminal, respectively from the emitter and the collector thereof;
  first and second variable capacity diodes with common terminals of a same polarity connected together and a variable control voltage applied to the point of said connection for controlling a delay time of said delay circuit, a terminal of said first diode having an opposite polarity from said common terminals being connected to the emitter of said transistor;
  a specified resistance with one end thereof connected to the collector of said transistor;
  an inductor having a specified Q value and connected to the other end of said resistance; and
  a delayed signal output terminal connected to the other end of said specified inductor and to a terminal of said second diode having an opposite polarity forms aid common terminals.

5. A delay circuit comprising delay circuits connected in multiple stages in cascade connection, each said delay circuit including a first transistor for receiving a signal to be delayed from the base connected to an input terminal, and outputting a positive phase signal and a negative phase signal with respect to the signal from said input terminal, respectively from the emitter and the collector thereof; two variable capacity diodes with their terminals of the same polarity connected together and a specified control voltage applied to the point of said connection, one end of said connected diodes being connected to the emitter of said first transistor; a second transistor with the base grounded, the emitter connected to the collector of said first transistor, and the collector connected to one end of a specified resistance; and a delayed signal output terminal having connected thereto the other end of said two variable capacity diodes and the other end of said specified resistance, wherein the same control voltage is applied to the cathodes, connected together, of said variable capacity diodes.

6. A delay circuit comprising a plurality of units connected in multiple stages in cascade connection, each said unit including: a first transistor for receiving a signal to be delayed from the base connected with an input terminal, and outputting a positive phase signal and a negative phase signal with respect to the signal from said input terminal, respectively from the emitter and the collector thereof; two variable capacity diodes with their terminals of the same polarity connected together and a specified control voltage applied to the point of said connection, one end of said connected diodes being connected to the emitter of said first transistor; a second transistor with the base grounded, the emitter connected to the collector of said first transistor, and the collector connected to one end of a specified resistance; and a delayed signal output terminal having connected thereto the other end of said two variable capacity diodes and the other end of said specified resistance, wherein a common control voltage is applied to the node of the terminals of the same polarity of the variable capacity diodes of each said unit; and wherein there is provided selector means for receiving delayed signal outputs of odd-number-stage units of said delay circuit from the collectors of said second transistors of the subsequent-stage units and delayed signal outputs of even-number-stage units from the delayed signal output terminals of the same even-number-stage units, and selectively outputting any one of the supplied delayed signals by a specified control signal.

7. A delay circuit according to claim 6, wherein a high input impedance circuit is provided between each said unit and said selector means.

8. A delay circuit according to claim 5, wherein a specified supply voltage is applied through a high resistance to the node between each said high input impedance circuit and said selector circuit.

9. An ultrasonic diagnosis apparatus comprising: a group of variable delay circuits including a plurality of variable delay circuits respectively receiving output from the oscillator elements arranged in an ultrasonic probe;

a variable delay control circuit for outputting a specified delay control signal to each said variable delay circuit;

a set of fixed delay circuits including a plurality of fixed delay circuits for respectively receiving outputs from the respective variable delay circuits of said set of variable delay circuits; and an adder circuit for receiving and adding outputs of the respective fixed delay circuits of said set of fixed delay circuits, wherein said variable delay circuit includes a first transistor for receiving a signal to be delayed from the base connected to an input terminal, and outputting a positive phase signal and a negative phase signal with respect to the signal from said input terminal, respectively from the emitter and the collector thereof; two variable capacity diodes with their terminals of the same polarity connected together and a specified control voltage applied to the point of said connection, one end of said connected diodes being connected to the emitter of said first transistor; a second transistor with the base grounded, the emitter connected to the collector of said first transistor, and the collector connected to one end of a specified resistance; and a delayed signal output terminal having connected thereto the other end of said two variable capacity diodes and the other end of said specified resistance, and wherein said variable delay control circuit supplies independent control signals to the respective variable delay circuits.

10. An ultrasonic diagnosis apparatus according to claim 9, wherein said variable delay circuits are connected in multiple stages in cascade connection, each said variable delay circuit includes a first transistor for receiving a signal to be delayed from the base connected to an input terminal and outputting a positive phase signal and a negative phase signal with respect to the signal from said input terminal, respectively from the emitter and the collector thereof; two variable capacity diodes with their terminals of the same polarity connected together and a specified control voltage applied to the point of said connection, one end of said connected diodes being connected to the emitter of said first transistor; a second transistor with the base grounded, the emitter connected to the collector of said first transistor, and the collector connected to one end of a specified resistance, and a delayed signal output terminal having connected thereto the other end of said two variable capacity diodes and the other end of said specified resistance, wherein said variable delay control circuit supplies an equal voltage as a control voltage of said delay circuits connected in multiple stages in cascade connection, said delay circuits constituting each said variable delay circuit.

11. An ultrasonic diagnosis apparatus according to claim 9, wherein each said delay circuit includes a first transistor for receiving a signal to be delayed from the base connected to an input terminal and outputting a positive phase signal and a negative phase signal with respect to the signal from said input terminal, respectively from the emitter and the collector thereof; two variable capacity diodes with their terminals of the same polarity connected together and a specified control voltage applied to the point of said connection, one end of said connected diodes being connected to the emitter of said first transistor; and a second transistor with the base grounded, the emitter connected to the collector of said first transistor, and the collector connected to one end of a specified resistance, said delay circuit being formed by units connected in multiple stages in cascade connection, each unit having a delayed signal output terminal with the other end of said two variable capacity diodes and the other end of said specified resistance connected thereto, a common control voltage being applied to the node of the terminals of the same polarity of said variable capacity diodes of each unit; and selector means for receiving delayed signal outputs of odd-number-stage units constituting said delay circuit from the collectors of said second transistors of the subsequent-stage units and delayed signal outputs of even-number-stage units from the delayed signal output terminals of the same even-number-stage units, and selectively outputting any one of the supplied delayed signals by a specified control signal.

12. An ultrasonic diagnosis apparatus according to claim 9, wherein said variable delay control circuit is formed by a ROM having stored therein control voltages of the respective channels and a D/A converter for D/A conversion of the contents of said ROM.

13. An ultrasonic diagnosis apparatus according to claim 8, further comprising a CPU for generating a variable delay control signal, a latch circuit for latching output of said CPU, and a D/A converter for D/A conversion of output of said latch circuit.

* * * * *